US008126287B2

(12) United States Patent
Alon et al.

(10) Patent No.: US 8,126,287 B2
(45) Date of Patent: Feb. 28, 2012

(54) CAMERA WITH IMAGE ENHANCEMENT FUNCTIONS

(75) Inventors: Alex Alon, Binyamina (IL); Irina Alon, Binyamina (IL)

(73) Assignee: DigitalOptics Corporation International, San Jose, CA (US)

( * ) Notice: Subject to any disclaimer, the term of this patent is extended or adjusted under 35 U.S.C. 154(b) by 150 days.

(21) Appl. No.: 12/614,346

(22) Filed: Nov. 6, 2009

(65) Prior Publication Data

US 2010/0141807 A1   Jun. 10, 2010

Related U.S. Application Data

(63) Continuation of application No. 10/541,967, filed as application No. PCT/IL2004/000040 on Jan. 15, 2004, now Pat. No. 7,627,193.

(60) Provisional application No. 60/440,561, filed on Jan. 16, 2003.

(51) Int. Cl.
| | |
|---|---|
| *G06K 9/40* | (2006.01) |
| *H04N 5/262* | (2006.01) |
| *H04N 5/225* | (2006.01) |
| *H04N 5/232* | (2006.01) |
| *G02B 13/16* | (2006.01) |
| *G03B 13/00* | (2006.01) |

(52) U.S. Cl. ........ 382/275; 382/255; 382/263; 382/264; 382/274; 348/240.99; 348/240.3; 348/335; 348/345; 348/347

(58) Field of Classification Search .................. 382/255, 382/263, 274–275; 348/240.99, 240.3, 335, 348/345, 347
See application file for complete search history.

(56) References Cited

U.S. PATENT DOCUMENTS

| | | | |
|---|---|---|---|
| 4,532,548 | A | 7/1985 | Zwirn |
| 4,691,366 | A | 9/1987 | Fenster et al. |
| 5,023,641 | A | 6/1991 | Merrick |
| 5,307,175 | A | 4/1994 | Seachman |
| 5,535,291 | A | 7/1996 | Spencer et al. |
| 5,580,728 | A | 12/1996 | Perlin |
| 5,748,371 | A | 5/1998 | Cathey, Jr. et al. |
| 5,748,491 | A | 5/1998 | Allison et al. |

(Continued)

FOREIGN PATENT DOCUMENTS

EP  0 466 277  1/1992

(Continued)

OTHER PUBLICATIONS

Kubala, Kenneth, et al., "Reducing Complexity in Computational Imaging Systems", Sep. 8, 2003, Optic Express, vol. 1, No. 18 (pp. 2102-2108).

(Continued)

*Primary Examiner* — Anand Bhatnagar
*Assistant Examiner* — Nathan Bloom
(74) *Attorney, Agent, or Firm* — Hickman Palermo Truong & Becker LLP

(57) ABSTRACT

Imaging apparatus (20, 44) includes an array (22) of optical sensing elements (24), characterized by a pitch, which is adapted to generate a signal in response to optical radiation that is incident on the elements. Objective optics (26, 46), which have an optical axis (134) and are characterized by a cylindrical symmetry about the axis, are arranged to focus the optical radiation from an object onto the array with a point spread function (PSF) having an extent greater than twice the pitch of the array at an optimal focus of the objective optics.

23 Claims, 9 Drawing Sheets

U.S. PATENT DOCUMENTS

| | | | |
|---|---|---|---|
| 5,751,861 A | 5/1998 | Astle | |
| 5,867,410 A | 2/1999 | Small Comb et al. | |
| 6,069,738 A | 5/2000 | Cathey, Jr. et al. | |
| 6,094,467 A | 7/2000 | Gayer et al. | |
| 6,104,839 A * | 8/2000 | Cok et al. | 382/254 |
| 6,154,574 A | 11/2000 | Paik et al. | |
| 6,181,830 B1 * | 1/2001 | Sato | 382/274 |
| 6,240,219 B1 | 5/2001 | Gregory | |
| 6,333,990 B1 | 12/2001 | Yazici et al. | |
| 6,344,893 B1 | 2/2002 | Mendiovic et al. | |
| 6,525,302 B2 | 2/2003 | Dowski, Jr. et al. | |
| 6,545,714 B1 | 4/2003 | Takada | |
| 6,567,570 B1 | 5/2003 | Steinle et al. | |
| 6,704,440 B1 | 3/2004 | Kump | |
| 6,724,945 B1 * | 4/2004 | Yen et al. | 382/274 |
| 6,757,012 B1 | 6/2004 | Hubina et al. | |
| 6,900,838 B1 | 5/2005 | Fujimura et al. | |
| 6,927,922 B2 | 8/2005 | George et al. | |
| 6,940,549 B2 * | 9/2005 | Dillen et al. | 348/246 |
| 7,003,177 B1 | 2/2006 | Mendiovic et al. | |
| 7,012,749 B1 | 3/2006 | Mendiovic et al. | |
| 7,061,693 B2 | 6/2006 | Zalevsky et al. | |
| 7,444,014 B2 * | 10/2008 | Dresser et al. | 382/154 |
| 2002/0012055 A1 | 1/2002 | Koshiba et al. | |
| 2002/0052722 A1 | 5/2002 | Yabe | |
| 2002/0118457 A1 | 8/2002 | Dowski, Jr. | |
| 2002/0145671 A1 | 10/2002 | Alon et al. | |
| 2003/0057353 A1 | 3/2003 | Dowski, Jr. et al. | |
| 2003/0169944 A1 | 9/2003 | Dowski, Jr. et al. | |
| 2003/0210828 A1 * | 11/2003 | Georgiev et al. | 382/254 |
| 2004/0096125 A1 | 5/2004 | Alderson et al. | |
| 2004/0218803 A1 | 11/2004 | Chanas et al. | |
| 2004/0234152 A1 | 11/2004 | Liege et al. | |
| 2004/0240750 A1 | 12/2004 | Chauville et al. | |
| 2004/0247195 A1 | 12/2004 | Chauville et al. | |
| 2004/0247196 A1 | 12/2004 | Chanas et al. | |
| 2004/0252906 A1 | 12/2004 | Liege et al. | |
| 2005/0002586 A1 | 1/2005 | Liege et al. | |
| 2005/0008242 A1 | 1/2005 | Liege et al. | |
| 2005/0094290 A1 | 5/2005 | Ben-Eliezer et al. | |
| 2005/0099516 A1 * | 5/2005 | Kagle et al. | 348/246 |
| 2006/0013479 A1 * | 1/2006 | Trimeche et al. | 382/167 |
| 2006/0050409 A1 | 3/2006 | George et al. | |
| 2006/0204861 A1 | 9/2006 | Ben-Eliezer et al. | |
| 2007/0019086 A1 * | 1/2007 | Yoshida et al. | 348/272 |
| 2010/0266218 A1 * | 10/2010 | Tezaur | 382/260 |

FOREIGN PATENT DOCUMENTS

| | | |
|---|---|---|
| EP | 0 814 605 | 12/1997 |
| EP | 1079612 A2 | 2/2001 |
| EP | 1627526 EP | 2/2006 |
| EP | 1672912 A2 | 6/2006 |
| EP | 1672912 A3 | 7/2006 |
| WO | WO-2004/063989 | 7/2004 |
| WO | WO-2005/031646 | 4/2005 |
| WO | WO-2006/039486 | 4/2006 |

OTHER PUBLICATIONS

Dowski E.R., et al., "Wavefront Coding: A Modern Method of Achieving High Performance and/or Low Cost Imaging Systems", Proceedings of the SPIE, Bellingham, VA, US. vol. 3779, Jul. 1999 (pp. 137-145).

Alter-Gartenberg R: "Information Metric as a Design Tool for Optoelectronic Imaging Systems", Applied Optics, OSA, Optical Society of America, Washington, D.C., US, vol. 39, No. 11, Apr. 2000 (pp. 1743-1760).

Michael Bass: "Handbook of Optics III", 1995, Mcgraw-Hill, Inc. New York (pp. 36.9).

European Search Report of EP Application 06 11 1394 dated Jun. 12, 2008.

Patent Abstracts of Japan, JP 2000-244799, "Image Pickup Device", Aug. 9, 2000.

Born & Wolf, "In Principles of Optics", $4^{th}$ Edition, Pergamon Press, 1970, Section 9.2 (pp. 464-467).

Bezdid, S.N., "The Use of Zernike Polynomials in Optics", Sov. J. Opt. Technology, Sep. 1974, vol. 41, No. 9 (pp. 425-429).

U.S. Appl. No. 60/440,561, "Lensless Camera with Image Enhancement Functions".

Michael Bass: "Handbook of Optics, vol. 1", Fundamentals, Techniques and Design (1995).

EPO Examination Report, Application No. 04 702 400 50-02209 dated Jun. 10, 2008 (4 pgs).

International Search Report, PCT Application No. IL2004/000040 dated Dec. 8, 2004 (3 pgs).

1st Office Action from CN for foreign patent application No. 200480002358.2 dated Sep. 4, 2006 (w/ English Translation) 19 pgs.

2nd Office Action from CN for foreign patent application No. 200480002358.2 dated May 25, 2007 (w/ English Translation) 7 pgs.

The State Intellectual Property Office of the People's Republic of China, Office Action, Applicant Tessera International, Inc., Application 201010149284.2, Dated, Jan. 12, 2011, 7 pages.

Current claims for China Office Action for foreign patent application 201010149284.2, 3 pages.

The State Intellectual Property Office of the People's Republic of China, Office Action, Applicant Tessera International, Inc., Application 201010149322.4, dated Jan. 27, 2011, 9 pgs.

Current claims for China Office Action for foreign patent application 201010149322.4, 4 pgs.

* cited by examiner

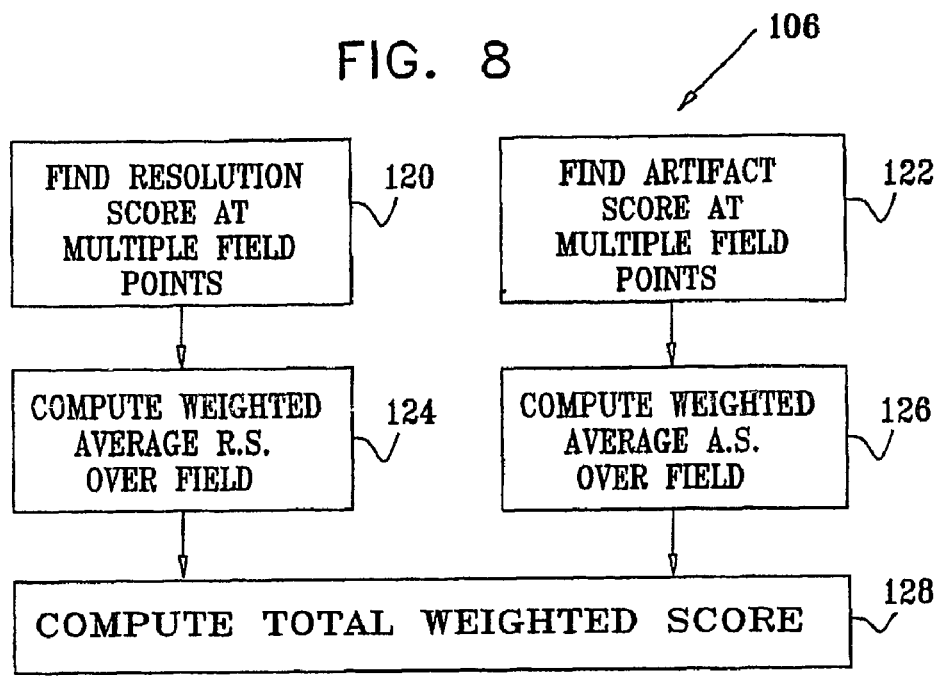
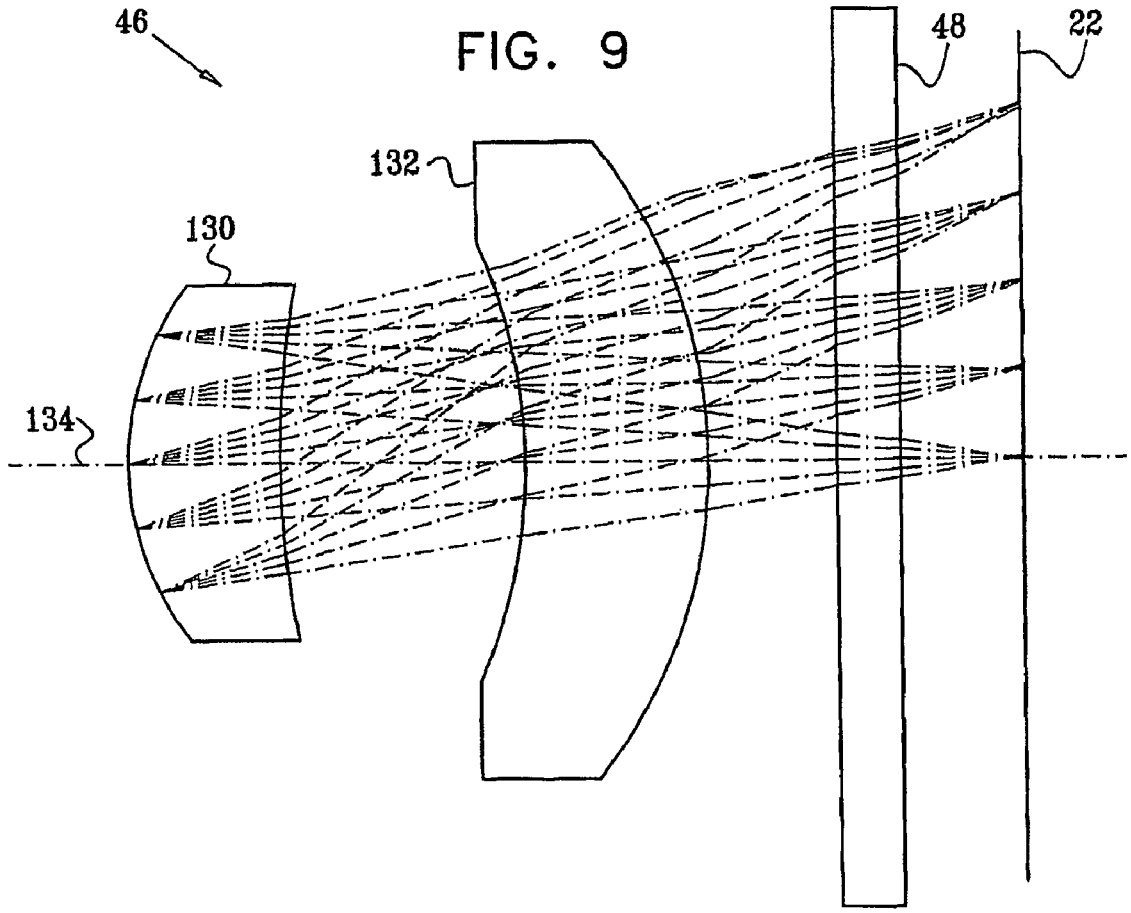

CAMERA WITH IMAGE ENHANCEMENT FUNCTIONS

CROSS-REFERENCE TO RELATED APPLICATIONS

This application is a Continuation of application Ser. No. 10/541,967, entitled "CAMERA WITH IMAGE ENHANCEMENT FUNCTIONS," filed Jun. 23, 2006 now U.S. Pat. No. 7,627,193, which is a national sage filing of PCT/IL04/00040, filed Jan. 15, 2004, which claims priority to U.S. Provisional Appln. 60/440,561, filed Jan. 16, 2003, the entire contents of which are hereby incorporated by reference as if fully set forth herein. The applicants hereby rescind any disclaimer of claim scope in the parent application(s) or the prosecution history thereof and advise the USPTO that the claims in this application may be broader than any claim in the parent application(s).

FIELD OF THE INVENTION

The present invention relates generally to digital imaging, and specifically to methods and devices for enhancing image quality in digital cameras, as well as designing optics for 10 such cameras.

BACKGROUND OF THE INVENTION

The inherent resolution of digital cameras known in the art, such as cameras based on CCD or CMOS sensor arrays, is generally limited by the resolution of the sensor array itself. In order to avoid degrading resolution still further, the objective optics used in such cameras are typically designed so that the optical point spread function (PSF) has an extent smaller than the pitch of the array. In other words, the optics are designed so that a bright point in the object plane is imaged to a spot no more than one pixel in size on the sensor array.

The PSF of an optical system may vary from the ideal due to focal variations and aberrations. A number of methods are known in the art for measuring and compensating for such PSF deviations by digital image processing. For example, U.S. Pat. No. 6,154,574, whose disclosure is incorporated herein by reference, describes a method for digitally focusing an out-of-focus image in an image processing system. A mean step response is obtained by dividing a defocused image into sub-images, and calculating step responses with respect to the edge direction in each sub-image. The mean step response is used. in calculating PSF coefficients, which are applied in turn to determine an image restoration transfer function. An in-focus image is obtained by multiplying this function by the out-of-focus image in the frequency domain.

As another example, U.S. Pat. No. 6,567,570, whose disclosure is incorporated herein by reference, describes an image scanner, which uses targets within the scanner to make internal 30 measurements of the PSF. These measurements are used in computing convolution kernels, which are applied to images captured by the scanner in order to partially compensate for imperfections of the scanner lens system.

It is also possible to add a special-purpose blur to an image so as to create invariance to certain optical aberrations. Signal processing is then used to remove the blur. A technique of this sort is described by Kubala et al., in "Reducing Complexity in Computational Imaging Systems," *Optics Express* 11 (2003), pages 2102-2108, which is incorporated herein by reference. The authors refer to this technique as "Wavefront Coding." A special a spheric optical element is used to create the blur in the image. This optical element may be a separate stand-alone element, or it may be integrated into one or more of the lenses in the optical system. Optical designs and methods of image processing based on Wavefront Coding of this sort are described, for example, in U.S. Pat. No. 5,748,371 and in U.S. Patent Application Publications US 2002/0118457 A1, US 2003/0057353 A1 and US 2003/0169944 A1, whose disclosures are incorporated herein by reference.

SUMMARY OF THE INVENTION

Some embodiments of the present invention provide methods and devices for improving the image quality of digital imaging systems. These methods and devices are useful particularly in creating digital cameras with simple, low-cost lenses (or even no lenses) that produce high-quality images. The novel principles of optical design and image processing that are taught by the present invention, however, are also applicable to digital imaging systems of other types.

In some embodiments of the present invention, an electronic imaging camera comprises an image sensing array. The camera typically comprises objective optics, which image an object onto the array with a PSF of extent substantially greater than the pitch of the sensing array even at optimal focus of the optics. (In one embodiment, the "objective optics" simply comprise an aperture—in the nature of a large "pinhole"—with no lens at all.) As a result, the images captured by the array itself are blurred. An image processor, which may be integrated in the camera, applies a deblurring function—typically in the form of a deconvolution filter—to the signal output by the array in order to generate an output image with reduced blur. This blur reduction is made possible by novel methods of image processing described hereinbelow. These methods make it possible to design and use camera optics with a poor inherent PSF, while restoring the electronic image generated by the sensing array to give an acceptable output image.

Typically, the objective optics are cylindrically symmetrical about the optical axis. In other words, if the optics are rotated about the axis, the image formed on the sensor array—and therefore the deblurring function that must be applied to the image—is substantially unchanged. By contrast, systems based on Wavefront Coding, as described in the publications cited in the Background of the Invention, intentionally use optics whose cylindrical symmetry is broken. Thus, these systems require exotic optical elements and are sensitive to variations in rotational alignment of the optics.

Because defect-free detector arrays are very costly, most electronic imaging cameras for consumer and industrial applications have a certain number of bad pixels, which do not produce a useful light signal. In some embodiments of the present invention, statistical analysis of images captured by the camera is used to discover these bad pixels in the sensing array. Typically, the bad pixels are identified in images captured by the camera as those whose pixel values differ from those of neighboring pixels by more than a threshold amount, which is determined by the PSF of the camera optics. Before deblurring the image (by deconvolution filtering), the values of the bad pixels are replaced with substitute values, so as to neutralize the influence of the bad pixels on the restored image. An iterative process of creating further blurred images and then deblurring the images is used to generate restored images of improved quality. In this process, the pixel values in the vicinity of the known bad pixel locations are modified at each iteration, in order to reduce propagation of artifacts due to the bad pixels. The input image may be surrounded by a frame of dummy pixels for the purposes of the deblurring operations, wherein the dummy pixels are treated as bad pixels.

Although the deblurring methods of the present invention may be used in cameras with substantially any sort of objective optics, in some embodiments of the present invention, the optics are designed by an iterative process, which takes into account the deblurring capabilities of the camera. For this purpose, an initial optical design is generated, and the PSF of the design is calculated based on the aberrations and tolerances of the optical design. A representative digital image, characterized by this PSF, is computed, and a deblurring function is determined in order to enhance the PSF of the image, i.e., to reduce the extent of the PSF. The design of the optical system is then modified so as to reduce the extent of the enhanced PSF.

In order to modify the optical design, the joint effects of variations in the optical design and concomitant changes in the enhanced PSF may be estimated. This estimate is used in determining how the optical design should be changed. The process of estimating the PSF enhancement and modifying the optical design accordingly is typically repeated iteratively until the design converges to within a predetermined tolerance. This process optimizes the overall performance of the camera, while permitting the use of low-cost optics with relatively high manufacturing tolerances and a reduced number of optical elements.

There is therefore provided, in accordance with an embodiment of the present invention, imaging apparatus, including:

an array of optical sensing elements, characterized by a pitch, which is adapted to generate a signal in response to optical radiation that is incident on the elements; and objective optics, which have an optical axis and are characterized by a cylindrical symmetry about the axis, and which are arranged to focus the optical radiation from an object onto the array with a point spread function (PSF) having an extent greater than twice the pitch of the array at an optimal focus of the objective optics.

In a disclosed embodiment, the extent of the PSF is at least three times the pitch.

Typically, the apparatus includes an image processor, which is coupled to process the signal from the array responsively to the PSF so as to generate an electronic image of the object while reducing a blur of the electronic image. In disclosed embodiments, the signal from the array corresponds to an input image including pixels having respective pixel values, and the image processor is adapted to reduce the blur by applying a deconvolution filter, based on the PSF, to the input image. The image processor may be adapted to identify one or more bad elements in the array and to replace the pixel values of the pixels in a vicinity of the bad elements in the input image with substitute values so as to produce a corrected blurred image, and to apply the deconvolution filter to the corrected blurred image so as to generate a restored image.

In some embodiments, the objective optics include one or more lenses, having optical characteristics that are selected, responsively to the PSF, so as to optimize a quality of the electronic image following application of the deconvolution filter.

Additionally or alternatively, the image processor is adapted to modify the deconvolution filter that is applied to the input image responsively to a change in a focal relationship between the object and the array. In one embodiment, the image processor is adapted to select a macro deconvolution filter when the object is less than a predetermined minimum distance from the objective optics.

There is also provided, in accordance with an embodiment of the present invention, imaging apparatus, including:

an array of optical sensing elements, characterized by a pitch, which is adapted to generate a signal in response to optical radiation that is incident on the elements; and a camera body, containing the array and having an aperture formed therein having a transverse dimension substantially greater than the pitch of the array, wherein the aperture and array are arranged so that the optical radiation from an object passes through the aperture and is incident on the array substantially without intervention of an optical focusing element.

In a disclosed embodiment, the apparatus includes a mechanism, coupled to at least one of the array and the aperture, for varying a distance between the array and the aperture so as to adjust a field of view of the device.

Typically, the transverse dimension of the aperture is at least 50% greater than the pitch. Optionally, the transverse dimension of the aperture is at least twice the pitch or even at least three times the pitch.

There is additionally provided, in accordance with an embodiment of the present invention, imaging apparatus, including:

objective optics, which are arranged to focus optical radiation from an object onto a focal plane with a characteristic point spread function (PSF);

an array of optical sensing elements, which is positioned at the focal plane and is adapted to generate a signal in response to the optical radiation that is incident on the elements, the signal corresponding to an electronic image of the object including pixels having respective pixel values;

an image processor, which is coupled to receive the signal from the array and is adapted to identify one or more bad elements in the array and, responsively to the PSF, to modify the pixel values of the pixels in a vicinity of the bad elements in the input image so as to produce a corrected blurred image while reducing propagation of artifacts due to the bad elements, and to apply a deconvolution filter, based on the PSF, to the corrected blurred image so as to generate a restored output image.

There is further provided, in accordance with an embodiment of the present invention, an image processor, including at least one integrated circuit device, which is adapted to receive a blurred input image of an object originating from an array of light detecting elements that includes one or more bad elements and is characterized by a point spread function (PSF), and responsively to the PSF, to modify values of pixels in a vicinity of the bad elements in the blurred input image, so as to produce a corrected blurred image while reducing propagation of artifacts due to the bad elements, and to apply a deconvolution filter to the corrected blurred image so as to generate a restored image.

There is moreover provided, in accordance with an embodiment of the present invention, a method for producing an optical system, including:

producing a design of the optical system;

computing an optical point spread function (PSF) of the optical system according to the design;

determining an enhanced PSF that can be achieved by application of a given image restoration function to an image produced by the optical system according to the design; and modifying the design of the optical system to reduce an extent of the enhanced PSF.

In some embodiments, producing the design includes assigning respective merit scores to each of a plurality of optical aberrations, determining the aberrations that are characteristic of the design, computing a design score responsively to the aberrations and the respective merit scores, and optimizing the design responsively to the design score. Typically, assigning the respective merit scores includes determining respective effects of each of the aberrations on the PSF, and calculating the respective merit scores responsively to the respective effects. Additionally or alternatively, determining the aberrations includes generating a Zernike polynomial expansion of the aberrations, and computing the design score includes calculating a weighted sum of the respective merit scores responsively to coefficients of the polynomial expansion.

In disclosed embodiments, determining the enhanced PSF includes determining coefficients of a deconvolution filter responsively to the computed optical PSF, and applying the deconvolution filter to a representative image that is characterized by the computed optical PSF.

Additionally or a alternatively, modifying the design includes estimating effects of variations in the design on the enhanced PSF, and modifying the design of the optical system responsively to the estimated effects. In a disclosed embodiment, determining the enhanced PSF includes computing an image quality score responsively to the enhanced PSF, and estimating the effects of the variations includes finding a dependence of the image quality score on the variations. Typically, computing the image quality score includes determining respective local point spread functions at a plurality of points in an image field of the optical system, and determining the image quality score responsively to the local point spread functions. Determining the image quality score may include finding respective local scores at the plurality of the points, and combining the local scores to generate the image quality score.

In one embodiment, determining the enhanced PSF includes calculating a weighted PSF by taking a weighted sum of the local point spread functions, and estimating the effects of the variations includes calculating the effects of the variations on the a weighted PSF.

In another embodiment, computing the image quality score includes finding a resolution score, which is indicative of a resolution of an image produced with the enhanced PSF, and finding an artifact score, which is indicative of a level of artifacts in the image, and combining the resolution score and the artifact score to determine the image quality score.

Typically, computing the image quality score includes determining the image quality score responsively to aberrations of the optical system, and finding the dependence of the image quality score includes calculating a gradient of the score with respect to changes in the aberrations. In a disclosed embodiment, finding the dependence of the image quality score includes determining a response matrix, indicative of the changes in the aberrations that will result as a function of specific modifications to the design of the optical system, and modifying the design includes determining a modification to be applied to the design responsively to the gradient and the response matrix.

In some embodiments, the method includes iteratively repeating, with respect to the modified design of the optical system, computing the optical PSF, determining the enhanced PSF, and modifying the design. Typically, iteratively repeating includes performing iterations through compiling the optical PSF, determining the enhanced PSF, and modifying the design until a modification to the design that is indicated by one of the iterations is less than a predetermined tolerance that is to be applied in manufacturing the optical system.

Typically, the optical system includes one or more optical elements, and the variations in the design include a change in at least one of a curvature of an optical surface of one of the elements, a thickness of one of the elements and a spacing between the elements. In a disclosed embodiment, the one or more optical elements include at least one aspheric element having at least one surface defined by a polynomial function, and modifying the design includes optimizing coefficients of the polynomial function.

There is furthermore provided, in accordance with an embodiment of the present invention, an optical system, including one or more optical elements, which are produced and assembled in accordance with a design that is optimized by computing an optical point spread function (PSF) of the optical system according to the design, determining an enhanced PSF that can be achieved by application of a given image restoration function to an image produced by the optical system according to the design, and modifying the design of the optical system to reduce an extent of the enhanced PSF.

There is also provided, in accordance with an embodiment of the present invention, a computer software product, including a computer-readable medium in which program instructions are stored, which instructions, when read by the computer, cause the computer to produce a design of the optical system, to compute an optical point spread function (PSF) of the optical system according to the design, to determine an enhanced PSF that can be achieved by application of a given image restoration function to an image produced by the optical system according to the design, and to modify the design of the optical system so as to reduce an extent of the enhanced PSF.

There is additionally provided, in accordance with an embodiment of the present invention, a method for electronic imaging, including:

generating a signal, using an array of optical sensing elements that is characterized by a pitch, in response to optical radiation that is incident on the elements; and focusing the optical radiation from an object onto the array using objective optics, which have an optical axis and are characterized by a cylindrical symmetry about the axis, to form an optical image with a point spread function (PSF) having an extent greater than twice the pitch of the array.

In disclosed embodiments, the method includes processing the signal from the array responsively to the PSF so as to generate an electronic image of the object while reducing a blur of the electronic image. Typically, the signal from the array corresponds to an input image including pixels having respective pixel values, and processing the signal includes applying a deconvolution filter, based on the PSF, to the input image. In one embodiment, applying the deconvolution filter includes modifying the deconvolution filter responsively to a change in a focal relationship between the object and the array. For example, modifying the deconvolution filter may include selecting a macro deconvolution filter when the object is less than a predetermined minimum distance from the objective optics.

There is further provided, in accordance with an embodiment of the present invention, a method for image processing, including:

identifying one or more bad elements in an array of light detecting elements;

capturing a blurred input image, characterized by a point spread function (PSF), of an object using the array;

modifying, responsively to the PSF, values of pixels in a vicinity of the bad elements in the blurred input image, so as to produce a corrected blurred image while reducing propagation of artifacts due to the bad elements; and applying a deconvolution filter, based on the PSF, to the corrected blurred image so as to generate a restored image.

Typically, the method includes performing iteratively modifying the values of the pixels in the vicinity of the bad elements in the restored image, so as to produce a new blurred image, and applying the deconvolution filter to the new blurred image so as to generate a new restored image.

In a disclosed embodiment, the method includes adding a frame of dummy pixels surrounding the input image, wherein the dummy pixels are treated similarly to the pixels associated with the bad elements for purposes of producing the corrected blurred image and generating the restored image.

In some embodiments, modifying the values includes determining substitute values with which to replace the pixel values in the vicinity of the bad pixels responsively to the PSF.

In one of these embodiments, determining the substitute values includes setting the substitute values using a correction map M[x] substantially of a form given by $$M[x] = \begin{cases} \left(\frac{1}{M'[x]} - 1\right) & M'[x] \neq 0 \\ 0 & M'[x] = 0, \end{cases}$$

wherein x is a pixel coordinate, and M'[x] is a convolved map given by a convolution of a map of the bad elements with a conjugate of the PSF.

Additionally or alternatively, identifying the one or more bad elements includes determining differences between the values of the pixels, and comparing the differences to a maximum difference dependent upon the PSF.

The present invention will be more fully understood from the following detailed description of some embodiments thereof, taken together with the drawings in which:

BRIEF DESCRIPTION OF THE DRAWINGS

FIG. 8 is a flow chart that schematically illustrates a method for computing an image quality score, for use in conjunction with the method of FIG. 7;

FIG. 9 is a schematic side view of objective optics designed using the method of FIG. 7, in accordance with an embodiment of the present invention;

DETAILED DESCRIPTION OF EMBODIMENTS

Definitions

The following is a non-exhaustive list of technical terms that are used in the present patent application and in the claims. Although these terms are used herein in accordance with the plain meaning accorded the terms in the art, they are listed below for the convenience of the reader in understanding the following description and the claims.

Pitch of a detector array refers to the center-to-center distance between elements of the array.

Cylindrical symmetry describes a structure, such as a simple or compound lens, which has an optical axis such that the structure is invariant under rotation about the optical axis for any and all angles of rotation.

Point spread function (PSF), expressed herein as h, is the impulse response of an optical system in the spatial domain, i.e., the image formed by the system of a bright point object against a dark background.

Extent of the PSF is the full width at half maximum (FWHM) of the PSF.

Optical transfer function (OTF) is the two-dimensional Fourier transform of the PSF to the frequency domain. Because of the ease with which a PSF may be transformed into an OTF, and vice versa, computation of the OTF is considered to be equivalent to computation of the PSF for the purposes of the present invention.

Optical radiation refers to electromagnetic radiation in any of the visible, infrared and ultraviolet regions of the spectrum.

Deblurring of Camera Images

Figure 1A:
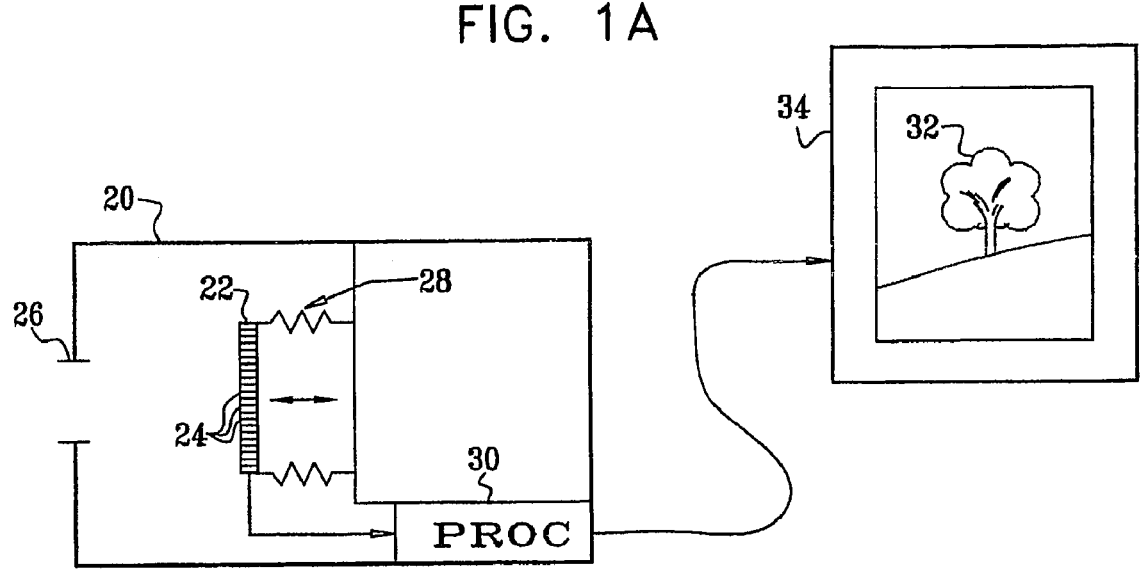
FIG. 1A is a schematic side view of a lensless camera, in accordance with an embodiment of the present invention.

FIG. 1A is a schematic side view of an electronic imaging camera 20, in accordance with an embodiment of the present invention. Camera 20 comprises an image sensor array 22, such as a CCD or CMOS image sensor, comprising a matrix of detector elements 24, as is known in the art. Optical radiation, typically visible light, from an object is incident on array 22 through an aperture 26, which serves as the objective optic of the camera. A motion device 28 may be operated to translate array 22 towards and away from aperture 26, for purposes of an optical zoom operation, as described below. Alternatively, the motion device may be coupled to translate aperture 26, rather than array 22, or to translate both the aperture and the array.

Figure 1B:
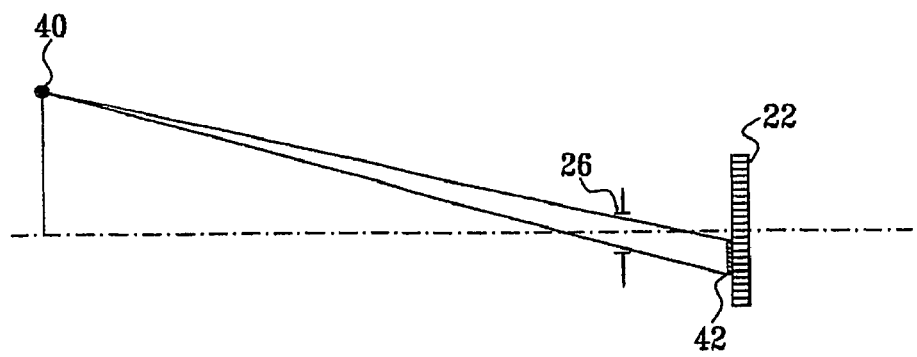
FIG. 1B is a schematic detail view of the camera of FIG. 1A, illustrating a point spread function of the camera.

FIG. 1B is a schematic, detail view of aperture 26 and array 22. In a conventional electronic imaging camera, a lens is used to focus an image of an object onto the sensor array, so as to produce a sharp image, wherein each point on the object is imaged to a point on the sensor plane. In camera 20, however, substantially no objective lens is used, so that the image incident on array 22 is necessarily blurred. Light emitted from a point 40 on the object will pass through aperture 26 to form a spot 42 on array 22. For conceptual simplicity (ignoring diffraction and other optical effects), for object point 40 much farther from aperture 26 than the aperture is from array 22, it can be stated that the extent of spot 42 is roughly equal to the diameter of aperture 26. Typically, the aperture diameter is substantially greater than the pitch of array 22, for example, twice or four times the pitch, or even greater. Thus, spot 42 covers a group of at least several mutually-adjacent pixels. It may equivalently be stated that the point spread function (PSF) of the image formed on array 22 has a characteristic extent that is roughly equal to the diameter of aperture 26.

Returning now to FIG. 1A, an image processor 30 processes the blurred input image generated by array 22 to produce a restored output image 32. Image processor 30 typically comprises one or more dedicated integrated circuit chips, which are contained inside camera 20. Alternatively or additionally, the image processor may comprise a programmable processor, with suitable software, and may be located either inside or outside the camera, i.e., the processor could be in a separate computer into which images from the camera are loaded. Processor 30 may be used not only in lensless camera 20, but also, mutatis mutandis, as an integral part or add-in element in other types of digital cameras and other imaging devices. Output image 32 may be displayed on a video monitor 34, for example, or it may alternatively be printed or stored in a memory.

Figure 2:
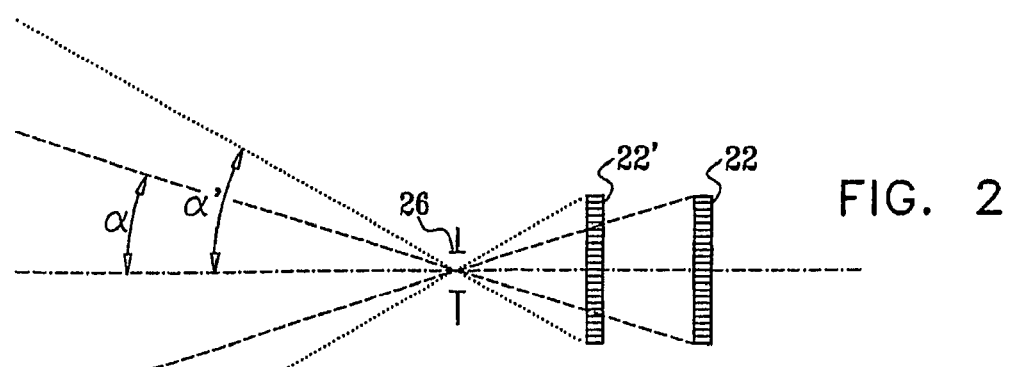
FIG. 2 is a schematic detail view of the camera of FIG. 1A, illustrating an optical zoom operation, in accordance with an embodiment of the present invention.

FIG. 2 is a schematic, detail view of aperture 26 and array 22, illustrating an optical zoom function of camera 20, in accordance with an embodiment of the present invention. Array 22 is translated by motion device 28 (FIG. 1) left/right along the horizontal axis in the figure, toward and away from aperture 26. When the array is relatively far from the aperture, it receives light from objects within a relatively narrow field of view, of angular half-width α. When the array is moved forward, toward aperture 26, to a position marked as 22', it sees a wider field of view, of angular half-width a'. This effect is equivalent to the optical zoom effect obtained by translating the objective lens (or lenses) in a conventional camera.

Figure 3:
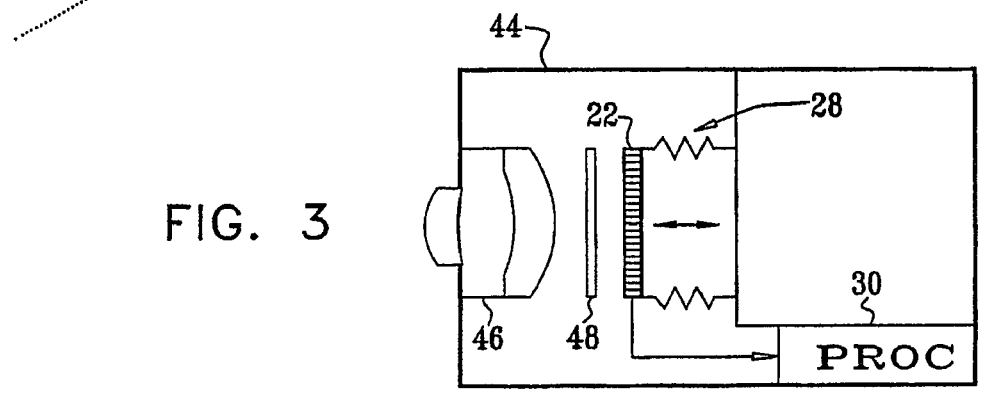
FIG. 3 is a schematic side view of a camera, in accordance with another embodiment of the present invention.

FIG. 3 is a schematic side view of an electronic imaging camera 44, in accordance with another embodiment of the present invention. Camera 44 is similar in construction and operation to camera 20, as described above, except that camera 44 comprises refractive objective optics 46, typically made up of one or more lenses. There may also be one or more filters 48 in the optical, path of the camera, such as an infrared-blocking filter. Typically, to reduce manufacturing costs, optics 46 comprise relatively few refractive elements, which are designed with relatively loose tolerances. As a result, the extent of the PSF of the optics is substantially greater than the pitch of array 22. Typically, the PSF extent is at least twice the pitch and may be greater than three times the pitch or even four times the pitch, in order to relax the design constraints on optics 46 and thus reduce the cost of camera 44. Note that the PSF may vary if the object distance or magnification (zoom) of the camera is changed. (The change in PSF in this case is more complex than the simple zoom function illustrated in FIG. 2.) Processor 30 may be programmed to compensate for such variations.

Image processor 30 deblurs the output image of camera 20 or 44 by applying a deconvolution filter (DCF) to the image, after first removing noise from the blurred image. The DCF may be regarded as a regularized inverse of the complex PSF h, such as:

$$DCF = \frac{h^*}{hh^* + \varepsilon} \quad (1)$$

wherein ε is a small constant. The processing method applied by processor 30 is described in detail in the above-mentioned U.S. patent application Ser. No. 09/778,849.

Further refinements to the technique described in that application, which may be applied by processor 30, are described in greater detail hereinbelow. For example, because the PSF h may vary over the image field of the camera, the deblurring process may be applied separately to different image segments, typically using a different DCF in each segment. The deblurred segments are then stitched together to generate a final, restored image. Deblurring of images using a DCF is the method of image restoration that is used in at least some embodiments of the present invention that are described herein. The DCF may be applied in either the spatial domain or the frequency domain. Equivalent, alternative techniques of image restoration will be apparent to those skilled in the art upon reading the above-mentioned U.S. patent application and the present patent application, and are considered to be within the scope of the present invention.

Figure 4:
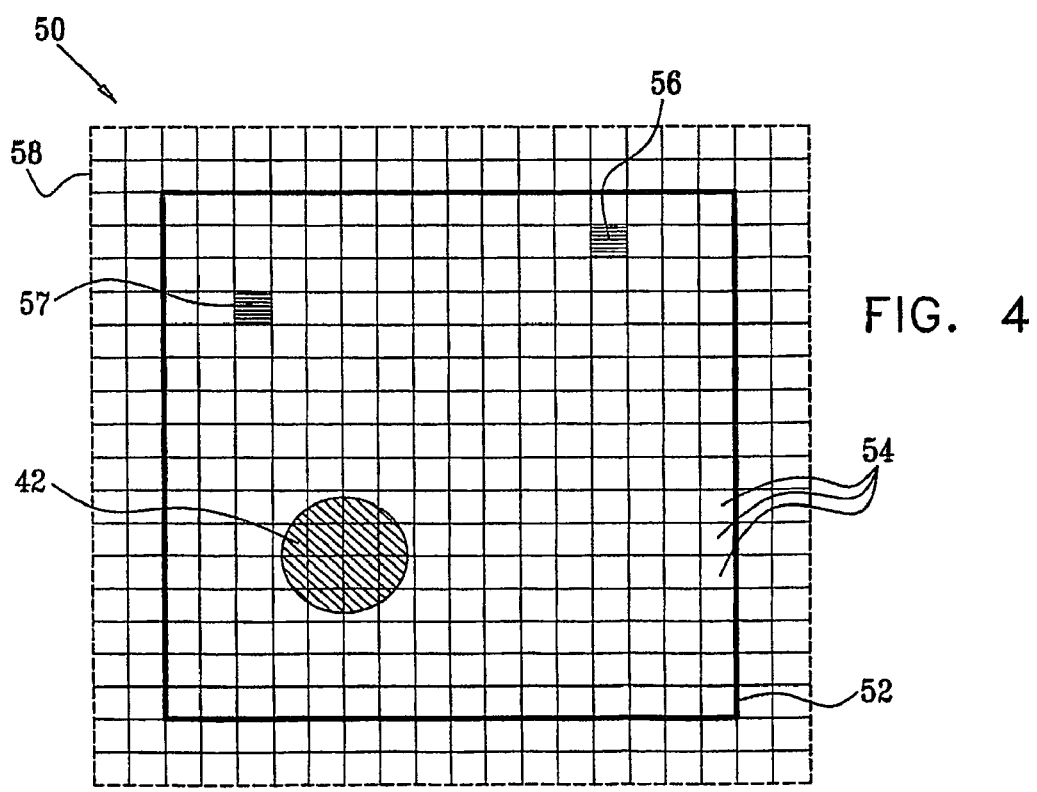
FIG. 4 is a schematic frontal view of a matrix of pixels in the image plane of a sensor array used in the camera of FIG. 3.

FIG. 4 is a schematic frontal view of a matrix 50 of pixels 54 captured by array 22, for processing by processor 30 in camera 20 or 44, in accordance with an embodiment of the present invention. Matrix 50 comprises an image area 52, made up of pixels 54, having values corresponding to the signals that are output by the corresponding elements 24 of array 22. For the most part, within the operating regime of array 22, the signals (and therefore the pixel values) are proportional to the intensity of light incident on the corresponding detector elements, with a fixed proportionality. For some pixels, however, such as a deviant pixel 56, the proportionality deviates from the norm, providing either higher or lower sensitivity than expected. Other pixels, such as a defective pixel 57, may provide unusable outputs, either because the corresponding elements 24 of array 22 are abnormally noisy or because they have very low sensitivity (or no sensitivity) to light. Such defective pixels are referred to herein as bad pixels. Note that "bad pixels" in the image may also arise from overexposed and underexposed pixels in the image, such as "hot spots" or "black spots" in the image, and that groups of mutually-adjacent bad pixels may cause bad areas in the image.

Spot 42 is effectively the image of a point source in the object plane of the camera. The blurring caused by the PSF of the camera, exemplified by spot 42 shown in FIG. 4, is equivalent in effect to low-pass filtering of the image, so that each pixel value is effectively averaged with the values of its neighbors. Therefore, the PSF imposes a limit on the possible difference in values of neighboring pixels, which is substantially less than the total dynamic range (for example, 255:1) of array 22. Differences between neighboring pixels that are in excess of this limit are indicative of defects in elements 24 of the array, due to deviant or bad pixels.

Figure 5:
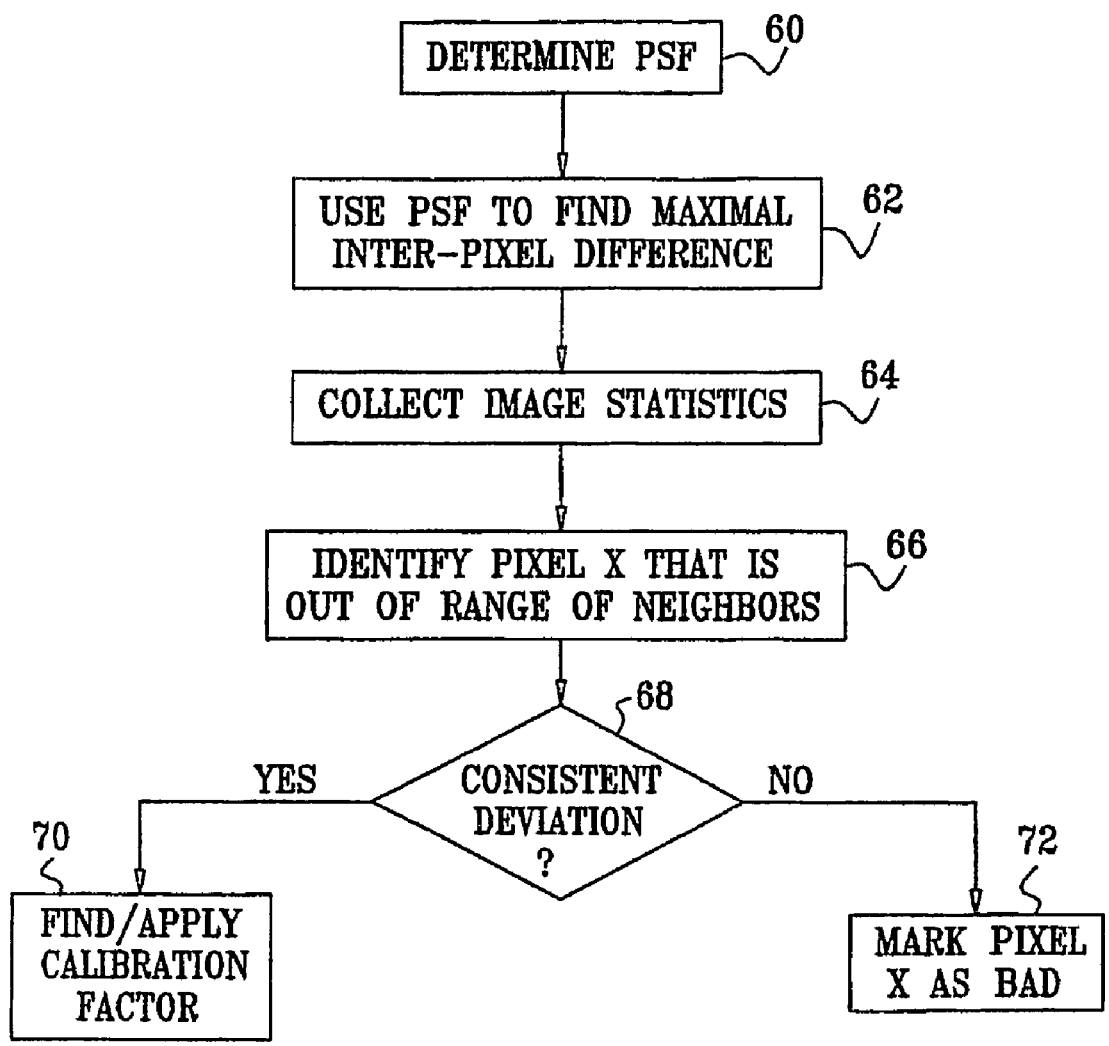
FIG. 5 is a flow chart that schematically illustrates a method for identifying bad pixels in images captured by an electronic imaging camera, in accordance with an embodiment of the present invention.

FIG. 5 is a flow chart that schematically illustrates a method for identifying such bad and deviant pixels, in accordance with an embodiment of the present invention. The method is described hereinbelow with reference to camera 44, although it may similarly be applied to camera 20 or to other types of electronic imaging devices. As a starting point for this method, the applicable PSF is ascertained, at 60. The PSF may be measured, using optical methods known in the art, or it may alternatively be calculated, based on the known characteristics of optics 46 and other salient characteristics of array 22 and camera 20. The PSF is used to determine the maximal permissible difference between values of neighboring pixels, at 62. This maximal difference may be determined, for example, by calculating the values of neighboring pixels, subject to the known PSF, in the area of a sharp edge of maximal contrast between bright and dark features in the object plane.

Camera 44 is operated in a test mode, in order to collect image statistics, at 64. In the test mode, the camera may be scanned, for example, over different image types and areas, and a sequence of corresponding images may be collected. Alternatively, the image statistics may be collected during normal operation of the camera. The values of neighboring pixels over the sequence of images are then compared, at 66, in order to identify pixels that are incompatible with their neighbors. Two types of incompatibility are identified, at 68, depending on the pattern of deviation between a given pixel and its neighbors:

Consistent deviation, characteristic of deviant pixels 56 in which the average value of the given pixel is higher or lower than its neighbors by a consistent proportionality factor. In this case, processor 30 determines a calibration factor, at 70, to be applied to the value of this pixel output by array 22 in order to adjust for the deviant sensitivity of the corresponding detector element 24.

Deviation without a consistent proportionality factor, characteristic of bad pixels 57, which are considered to give no useful information. Processor 30 marks these pixels for special processing treatment, at 72. Handling of these bad pixels by processor 30 is described below with reference to FIG. 6.

An advantage of this approach for handling bad and deviant pixels is that it allows camera 44 to use an array 22 with a relatively large number of deviant and/or defective elements 24, while still producing images of good quality.

It is also possible for processor 30 to identify and compensate for pixels that are not inherently defective, but give "bad" output signals in a particular image. For example, when camera 44 captures a scene having an excessively bright point of light, the corresponding pixel in the image may be saturated, and blooming may cause the saturation to spread to neighboring pixels. Before deblurring the image, processor 30 may recognize these effects and may add the pixels at which they occur to its current map of bad pixels.

Figure 6:
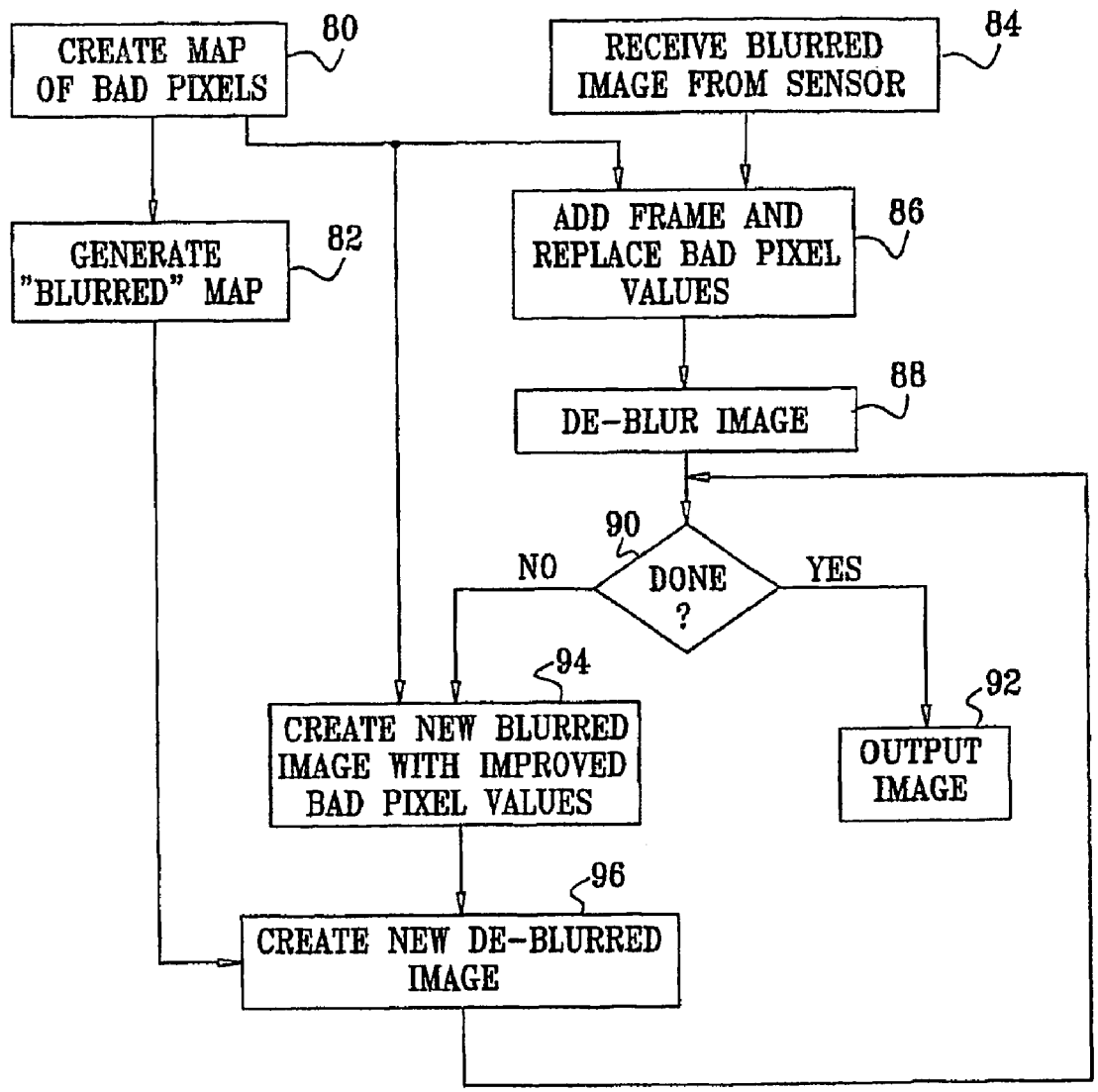
FIG. 6 is a flow chart that schematically illustrates a method for deblurring images, in accordance with an embodiment of the present invention.

FIG. 6 is a flow chart that schematically illustrates a method applied by processor 30 in generating deblurred output image 32, in accordance with an embodiment of the present invention. The method is based, inter alia, on creating a map D[x] of bad pixels, as described above, at 80. Here x is a generalized vector coordinate in the spatial (pixel) domain. D[x] has the value 0 for bad pixels, and 1 elsewhere.

For the purposes of this method, a "blurred" map of the bad pixels is created, by convolving map D with the conjugate PSF h*, at 82. In the spatial frequency domain, the Fourier transform of the convolved map is given by:

$$\tilde{M}'[q] = \tilde{h}^*[q] \cdot \tilde{D}[q] \quad (2)$$

wherein $\tilde{h}^*[q]$ and $\tilde{D}[q]$ are the Fourier transforms of the PSF and the bad pixel map, respectively, and q is a generalized vector coordinate in the transform (frequency) domain. The new correction map M is found by retransforming M' to the spatial domain and setting:

$$M[x] = \begin{cases} \left(\frac{1}{M'[x]} - 1\right) & M'[x] \neq 0 \\ 0 & M'[x] = 0 \end{cases} \quad (3)$$

Alternatively, M' may be computed in the spatial domain, rather than transforming the maps back and forth by Fourier transformation.

Note that in the vicinity of bad pixels, the convolved map values M'[x] may be much less than one, so that the corresponding correction map values M[x] may be very large. The inventors have found that the use of such a correction map, in the manner described below, gives much better results than conventional methods of interpolation, in terms of faithful reconstruction of the correct image with minimal artifacts. These artifacts stem, inter alia, from the non-localized nature of the PSF and of the DCF that must be used to compensate for it. When simple interpolation is used to smooth over the areas of bad pixels, the resulting image is typically either blurred (at least in the interpolated area) or is marred by noticeable artifacts. The correction map provided by some embodiments of the present invention, on the other hand, replaces the values of the bad pixels while preserving the underlying spatial frequency structure of the surrounding good pixels. Thus, propagation of artifacts from the bad pixels to the other pixels in their vicinity is reduced substantially. Alternatively, the correction map may be determined using other formulas that are similar in behavior to that defined in equation (3), though differing in algebraic form. Such alternative formulas are considered to be within the scope of the present invention. In any case, the bad pixel replacement technique described herein permits array 22 to include a relatively large number of bad pixels without causing a substantial adverse effect in the output images from the camera. Thus, the cost of the camera may be reduced by using inexpensive, low-quality arrays with relatively large numbers of bad pixels.

Processor 30 receives an input image from array 22 (which is blurred by the PSF of optics 46), at 84. The image includes bad pixels, at locations that were marked at 80. Processor replaces the values of the bad pixels, at 86, with estimated correct values. The estimated values may be determined, for example, by interpolation from the values of adjacent good pixels. The good pixels in the image remain unchanged, except to the extent that it is necessary to adjust their values by the calibration factors found at 70 (FIG. 5).

In addition, at 86, processor 30 adds a frame 58 around the edges of image area 52. The purpose of this frame is to provide for the inherent periodicity of the Fourier transform that is to be applied in deblurring the image. The width of frame 58 is, for example, roughly equal to the radius of the PSF. The pixels in frame 58 are treated as "bad" pixels for the purposes of the method of FIG. 6. The initial values of these pixels are obtained by interpolating between the values of the "good" pixels at the adjacent right and left edges or lower and upper edges of area 52. The frame pixels thus add a periodic structure to the image, which is useful in suppressing artifacts that could otherwise be introduced due to the image edges when transforming the image between the spatial and transform domains.

The corrected, framed, blurred image obtained at 86, $B_0$, is convolved with the DCF (equation 1) to generate an initial deblurred image $r_0$, at 88. Formally, in simplified terms, $r_0[x] = DCF * B_0[x]$, wherein the operator "*" represents convolution. In practice, the operation is typically performed in the Fourier transform domain, and is accompanied by noise reduction steps, as described in the above-mentioned U.S. patent application Ser. No. 09/778,849.

Processor 30 then evaluates $r_0$ to determine whether additional processing is desired in order to improve the image quality, at 90. The basis for the decision at 90 may be the amount of processing time that has elapsed, or the number of iterations that have been carried out, or it may be a measure of the image quality. These decision criteria are described further hereinbelow. If processor 30 determines that processing of the current image has been completed, the image is output, at 92, and the process terminates. Typically, frame 58 is removed before outputting the image. Alternatively, part or all of the frame may be left in the output image, since it may contain information (due to the large PSF of the camera) that was outside the nominal field of view of the image.

Alternatively, processor 30 may continue to process the current image iteratively, in order to generate a sharper, more accurate image of the object. For this purpose, the blurred image $B_i[x]$ ($B_0$) and the deblurred image $r_i[x]$ ($r_0$) from the preceding iteration are used in creating a new blurred image $B_{i+1}[x]$, at 94, with better values of the bad pixels:

$$B_{i+1}[x]=(h*r_i[x])(1-D[x])+D[x]B_i[x] \quad (4)$$

In other words, the previous deblurred image is convolved with the PSF, and the bad pixel map D is used to substitute the pixel values thus obtained into $B_{i+1}$ at the locations of the bad pixels. The values of the good pixels in $B_i$ remain unchanged.

The new blurred image, $B_{i+1}$, with the improved bad pixel values, is used to create an improved deblurred image $r_{i+1}$, at 96. The pixel values in $r_{i+1}$ can be expressed as follows:

$$r_{i+1}[x]=DCF*B_{i+1}[x]+M[x]h*[x]*[(B_i[x]-h*r_i[x])D[x]] \quad (5)$$

Here again, the convolution operations are typically carried out by transforming the terms of equation (5) to the Fourier transform domain, multiplying, and then transforming back to the spatial domain, as will be apparent to those skilled in the art. The first term of $r_{i+1}$ simply represents deblurring of the new blurred image, $B_{i+1}$ by the DCF. The second term is added to remove the effect of the estimated bad pixel values on the values of the good pixels in the new deblurred image. This term uses the correction map values derived at 82, as expressed by equation (3). In each iteration, this term generates new values for the pixels on which it operates, so as to reproduce more faithfully the actual spatial frequency structure of the correct image.

At this point, processor 30 again assesses the quality of the deblurred image and/or the processing time or iterations elapsed, at 90, and decides whether to terminate the computation, or continue for another iteration. The iterations may continue in this manner indefinitely, until the image is finally output at 92.

In addition, further image enhancement operations may be applied at 92 before the final image is stored and/or displayed. The further operations are generally directed to reducing noise in the image and/or removing artifacts. For example, a smoothing filter may be applied in order to reduce noise. In order to maintain edge contrast, local image gradients may be determined, and a one-dimensional smoothing filter may then be applied in a direction orthogonal to the local gradient.

As another example, "ghost edges," which sometimes appear as artifacts in the vicinity of actual sharp edges in the image, may also be removed at this stage. For this purpose, an edge image is created by smoothing the deblurred image, while preserving the actual, strong edges in the image. This edge image is considered to be artifact-free (although lacking in all detail except for the strong edges). Blurring and restoration operations are applied to the edge image, resulting in the appearance of the ghost edges. Subtracting the artifact-free edge image from the this latter image gives an image that contains only artifacts (footprints) of the ghost edges. The footprints of the ghost edges can now be subtracted from the original deblurred image in order to eliminate the artifacts.

Alternatively or additionally, other methods for image enhancement and artifact reduction may be applied at 92. Exemplary methods, which may be applied, *mutatis mutandis*, by processor 30, are described in U.S. Pat. Nos. 4,691, 366, 5,751,861 and 6,094,467, whose disclosures are incorporated herein by reference.

Optical Design Optimized for Image Restoration

Figure 7:
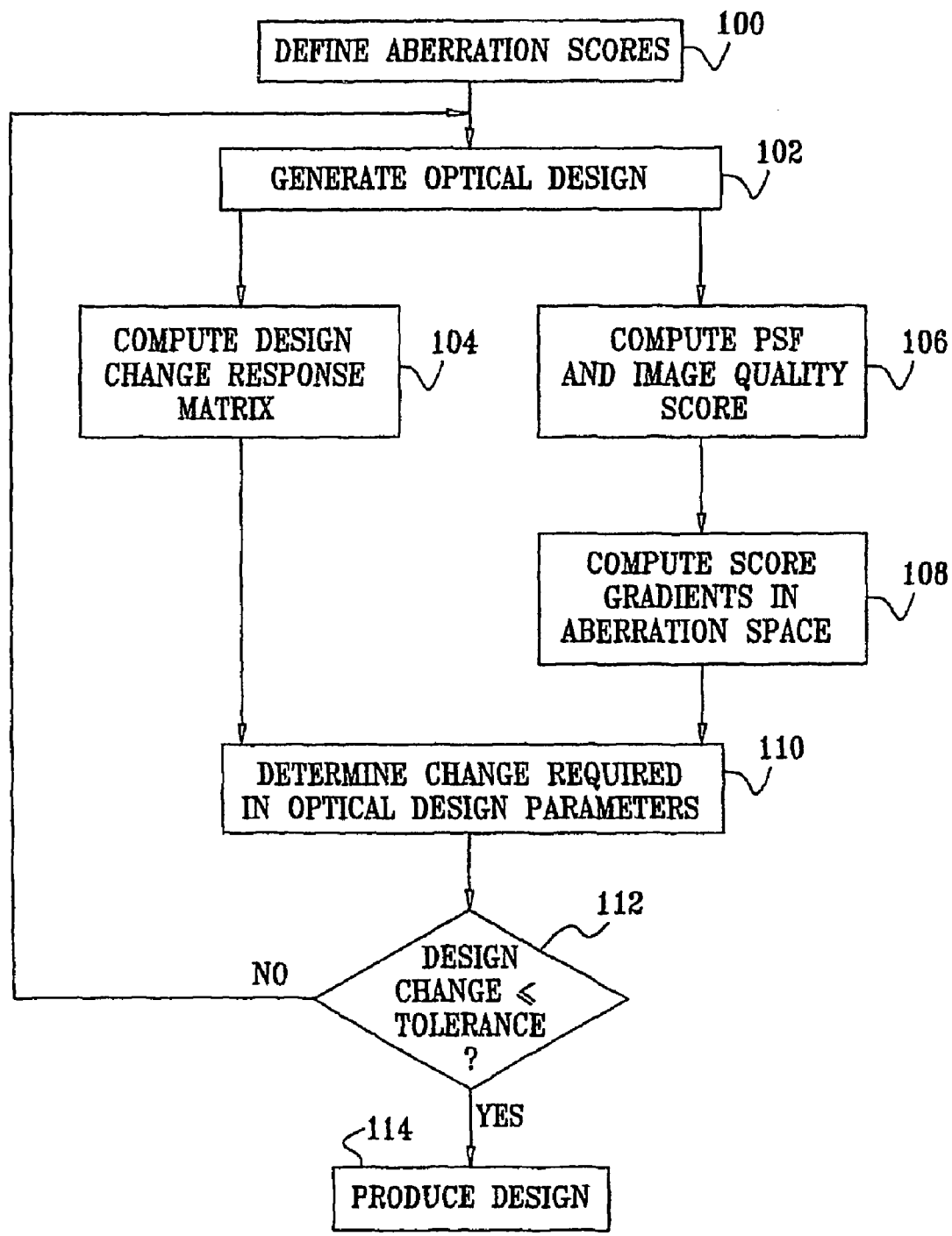
FIG. 7 is a flow chart that schematically illustrates a method for optical design, in accordance with an embodiment of the present invention.

FIG. 7 is a flow chart that schematically illustrates a method for designing optics 46, for use in a digital camera with a deblurring function, in accordance with an embodiment of the present invention. The method takes advantage of foreknowledge of the image restoration function to be applied by processor 30, in order to generate an optical design that is optimized for this function. After generating an initial optical design, the optical PSF of the optical system is computed, and is used in determining an enhanced PSF that can be achieved by application of the deblurring function to images produced by the optical system according to the design. A response matrix is also computed based on the optical design, indicating the effects of variations in the design on the enhanced PSF. The design of the optical system is then modified based on the response matrix to give a new design that will have a better enhanced PSF after image restoration. This process may be repeated iteratively to give successively better designs. Although the method of FIG. 7 is described hereinbelow with reference to camera 44 and to the deblurring method shown in FIG. 5, it may similarly be applied to other cameras and to other types of electronic imaging systems, including systems that use other algorithms for image restoration, as are known in the art.

Turning now to the details of the method of FIG. 7, as a preliminary stage, before generating the optical design, aberration scores may be defined for use in the optical design, at 100. This stage is not mandatory, but it is useful in achieving faster convergence of the iterative design method described below. A merit function is assigned to each significant aberration that may characterize optics 46. For this purpose, the inventors have found it most convenient to express the aberrations in terms of the Zernike polynomials, as are known in the art, for each of the colors red, green and blue individually. The Zernike polynomials are described, for example, by Born & Wolf in *Principles of Optics*, $4^{th}$ edition (Pergamon Press, 1970), in section 9.2, pages 464-467, which is incorporated herein by reference. Standard software packages for optical design, such as ZEMAX® (produced by ZEMAX Development Corp., San Diego, Calif.), are capable of computing the Zernike polynomial coefficients for substantially any design that they generate. Values of the merit functions may be provided at 100 in tabular form. Generation of these values is described below with reference to FIG. 8.

An initial optical design is produced, at 102. The design is typically generated using optical design software running on a suitable computer workstation. The software may be downloaded to the workstation in electronic form, or it may alternatively be provided on tangible media, such as CD-ROM or DVD. The optical design software may comprise an off-shelf package, such as the above-mentioned ZEMAX software, with additional program components for carrying out the optimization functions described herein. The software accepts as inputs the system requirements that are imposed on optics 46, such as the number of optical elements, materials, tolerances, focal length, magnification, aperture (F-number) and resolution. As noted above, the optical resolution, expressed in terms of the PSF of the optics, typically gives a focal spot size that is substantially greater than the pitch of array 22. The overall system resolution is then enhanced by deblurring.

The optical design software may use the aberration scores provided at 100 in determining a design score, which is a total of the merit scores taken over all the aberrations of the design. The design score indicates how to trade off one aberration against another in order to generate an initial design that maximizes the total of the merit scores subject to the optical requirements mentioned above. As a result of using the merit scores in this manner, the optical design generated at 102 may not be the one that gives the minimum total blur in the image formed on array 22. The optical image will, however, be characterized by a combination of aberrations that can typically be deblurred by processor 30 to give a better-quality electronic output image.

The optical design software is also used to generate a design change response matrix, at 104. This matrix reflects the impact that small changes in the optical design parameters will have on the different aberrations of the optical system. The optical design parameters that may be changed include, for example, curvatures of different lens surfaces, as well as thickness and spacing of the lenses. The matrix is a sort of multi-dimensional gradient, having entries (i,j) that represent the ratio $R^i_j = \Delta(\text{aberration}[j])/\Delta(\text{optical\_parameter}[i])$.

The optical design is also used in computing the PSF of the optics and an associated image quality score S, at 106. The total aberration—and hence the PSF—at any point in the image plane may be obtained from the total wave front aberration, which is calculated simply by summing the values of the Zernike polynomials. As noted above, the Zernike polynomial coefficients are generally available as output from standard optical design programs, such as the above-mentioned ZEMAX. The image quality score computed at 106 typically combines the effects of the PSF on image resolution and on artifacts in the image, and reflects the ability of processor 30 to compensate for these effects using the chosen image restoration (deblurring) algorithm. The PSF typically varies with wavelength and is not uniform over the entire image plane. Therefore, the resolution and artifact scores may be computed at multiple field points in the image plane and then combined, typically by weighted averaging. An exemplary method for calculating the image quality score S is described below with reference to FIG. 8.

The effects of small changes in the aberrations on the image quality score is determined at 108. At this stage, small changes are made in each of the aberrations, and the resulting change in the image quality score is computed. This operation gives a score gradient $A_j = \Delta S/\Delta(\text{aberration}[j])$.

The results of 104 and 108 are then combined to determine an optimal change that should be applied to one or more of the optical design parameters in order to increase S, at 110. Using the response matrix R and the score gradient vector $\underline{A}$, whose elements $R^i_j$ and $A_j$ are defined above, the optical design change vector $\Delta\underline{O}$ is given by:

$$\Delta\underline{O} = (R^t R)^{-1} \cdot R^t \underline{A} \quad (6)$$

wherein $R^t$ is the Hermitian transpose of R. Each of the elements of $\Delta\underline{O}$ indicates the changes that should be made to one of the variable design parameters of the current optical design, as generated at 102.

The magnitude of the design changes indicated by $\Delta\underline{O}$ is compared to a predetermined tolerance threshold, at 112. The tolerance threshold may be set arbitrarily, but typically it is determined by the manufacturing tolerances that have been specified for camera 44 and optics 46. For example, if the spacing between two lenses in the optical system is specified to be accurate to within 0.2 mm, then there is little point in implementing a change in the design spacing of 0.1 mm that may be indicated by $\Delta\underline{O}$. If the elements of $\Delta\underline{O}$ are all less than the applicable tolerance thresholds, the design cycle is done, and the design may be output for production, at 114.

Alternatively, as long as one or more elements of $\Delta\underline{O}$ are found to exceed the tolerance thresholds at 112, the design process returns to 102, in order to generate a revised optical design implementing the design change $\Delta\underline{O}$ computed at 110. The operations of 104-110 are then repeated, as described above. This iterative process may continue until all elements of $\Delta\underline{O}$ are found to be less than the applicable thresholds at 112, or until a certain maximum number of iterations have taken place, or until some other criterion or combination of criteria have been satisfied.

FIG. 8 is a flow chart that schematically shows details of a method of scoring that is performed at 106, in accordance with an embodiment of the present invention. As noted above, the image quality score is determined by calculating and combining a resolution score and an artifact score. Individual scores may be computed at multiple points in the image field and at multiple different wavelengths. In one embodiment, the scores are computed for nine points along the positive X-axis, at each of three different wavelengths (red, green and blue). Because the optics are cylindrically symmetrical, the optical characteristics on the positive X-axis are sufficient to characterize the entire field.

To find the resolution score, individual X- and Y-direction resolution scores, $S_x^{Res}$ and $S_y^{Res}$, are determined for each wavelength at each selected field point, at 120. Since the field points are taken along the X-axis, $S_x^{Res}$ represents the resolution in the tangential plane, while $S_y^{Res}$ represents the resolution in the sagittal plane. In an exemplary embodiment, the scores are calculated at each field point and wavelength as follows:

1. The PSF is calculated based on the aberrations, typically using the Zernike polynomial representation as described above.
2. The PSF is scaled to the pitch of sensor array 22.
3. The PSF is applied to generate a representative image. Typically, this representative image is created by blurring an ideal image that is zero everywhere except for the pixel at the origin (the current field point), which has the value 1. In other words, $I(x, y) = \delta_{x,y}$, wherein $I(x, y)$ is the image pixel array, x, y are the integer pixel coordinates, and $\delta_{x,y}$ is the Kronecker delta function. Alternatively, other types of representative images may be used, such as line or grid images.
4. The representative image is deblurred using a deconvolution filter DCF(h), as described above, in order to generate a restored image r(x,y). Here h is the PSF that is used in generating the DCF. Various deconvolution filters may be chosen and used at this stage. For example, h may be taken as the local PSF calculated for this particular field point and wavelength, and the DCF may be computed based on this local value, using the formula given by equation (1) above. Alternatively, a single, optimized DCF may be used for all field points and wavelengths. This same optimized DCF may be applied subsequently by processor 30 in order to deblur images produced by camera 44. An exemplary method for calculating the optimized DCF is described below.
5. The restored image r(x,y) is transformed to the spatial frequency domain by applying a two-dimensional Fourier transform, to give the transformed image $\tilde{R}(p,q)$, wherein (p,q) are the spatial frequency coordinates in the X- and Y-directions, respectively.
6. The score in the X-direction is determined by the slope of a step function in the X-direction that has been blurred and restored, as given by the transformed image:

$$s_s^{Res} = \frac{\sum_{p=0}^{p=p_{Max}} |\tilde{R}(p, 0)|}{p_{Max} + 1}.$$

Here pMax is the Nyquist frequency in the X-direction.

7. The score in the Y-direction is similarly determined by the slope of a step function in the Y-direction that has been blurred and restored:

$$S_y^{Res} = \frac{\sum_{q=0}^{q=q_{Max}} |\tilde{R}(0,q)|}{q_{Max}+1}.$$

In this case, qMax is the Nyquist frequency in the Y-direction.

The individual X- and Y-resolution scores at all the selected field points are combined to give a total resolution score, at 124. Typically, the average is weighted in such a way as to give greater emphasis to the bad (low) individual resolution scores. For example, the total resolution score may be a product of exponents of the inverses of individual resolution scores (see equation (7) below). Alternative mechanisms for weighted averaging will be apparent to those skilled in the art. As a further alternative, the total score may simply be set equal to the worst of the individual scores.

Individual artifact scores, $S_x^{Art}$ and $S_y^{Art}$, are similarly computed for each field point and wavelength, at 122. The individual scores may be calculated as follows:

1. The extent in the X-direction of the artifact created by the DCF is determined by applying a one-dimensional Fourier transform to $\tilde{R}(p,0)$, to give the spatial domain function $$R_x^{1D}(x).$$

This function is typically characterized by a central peak, surrounded by side lobes. The extent of the artifact in the X-direction, $W_x$, is given by the distance of the outer boundary of the highest-order side lobe from the origin:

$$W_x = \text{Max}\{x \mid |R_x^{1D}(x)| > \varepsilon_{Art}\},$$

wherein $\varepsilon_{Art}$ is some threshold value, typically on the order of 1%.

2. The amplitude of the artifact created by the DCF is determined by finding the inner boundary of the highest-order side lobe:

$$Z_x^{Art} = \text{Min}\{x \mid |R_x^{1D}(x)| < 0\},$$

and then finding the maximal amplitude outside this boundary:

$$A_x = \text{Max}\{|R_x^{1D}(x)| \mid x \geq Z_x^{Art}\}.$$

3. The artifact score in the X-direction is given by the product: $S_x^{Art} = W_x \cdot A_x$.

The Y-direction artifact score is computed in like manner.

The total artifact score is computed by combining the individual scores, typically as a weighted average, at 126. In this case, the weighting typically emphasizes the higher individual scores, which point to more severe artifacts. Alternatively, as at 124, the total artifact score may be set equal to the worst individual score. The total image quality score S is then determined as an average of the resolution and artifact scores, at 128. For example, equation (7) below combines the operations of 124, 126 and 128:

$$S = \exp\left(\sum_{\omega,f} (S_x^{Art} + S_y^{Art} + \lambda/S_x^{Res} + \lambda/S_y^{Res})\right) \qquad (7)$$

Here the summation is taken over all field points f and wavelengths ω. λ is an empirically-derived constant, which may be chosen so as to give greater emphasis to either improving resolution or reducing artifacts in the output image, depending on system requirements.

As noted above, any suitable DCF may be used in computing the image quality scores and gradients. Although a different DCF may be used for each different field point and wavelength, as described above, it is simpler to implement processor 30 using a single, uniform DCF over the entire field, or at least a DCF with relatively few variations over the field. Therefore, in optimizing the optical design, in accordance with the method of FIGS. 7 and 8, it is desirable to use a uniform PSF, as well, so that the optical design will reflect the actual image enhancement that the deblurring algorithm will provide.

In one embodiment, a weighted PSF, referred to herein as $h_{Opt}$, is used as the uniform PSF for the purposes of the optical design process. The weighted PSF provides an optimized estimate of the PSF in the sense that the corresponding DCF has the greatest probability of providing optimal deblurring in the greatest number of units of camera 44 that are actually produced. $h_{Opt}$ is calculated for this purpose by weighted averaging of individual PSFs over the image field. The weighted PSF may also take into account variations that may occur in the individual PSF values due to manufacturing tolerances in optics 46, in sensor array 22, and possibly in other elements of camera 44. For example, hop may include contributions from several different individual PSFs calculated for the same field point and wavelength, using different optical parameters as defined by the bounds of the system tolerances. Each individual PSF, $h_i$, is multiplied in the averaging process by a weight $W_i$, such that the weights sum to one. The weights may be chosen so as to give greater importance to the field points that are closer to the center of the field and/or to favor one wavelength (typically green) over the others. When multiple PSFs are calculated based on different optical parameters, the weights may also reflect the probability of manufacturing variances within the tolerance range.

Under these conditions, it can be shown that the optimal DCF, which minimizes the probable deviation of the deblurred image relative to an ideal image, is given (in the frequency domain) by:

$$DCF_{opt}(p,q) = \frac{\sum_i W_i h_i^*}{\sum_j W_j h_j^* h_j} \qquad (8)$$

Comparing this result to the naïve definition DCF=1/h gives the result:

$$h_{opt}(p, q) = \frac{\sum_j W_j h_j h_j^*}{\sum_i W h_i^*} \quad (9)$$

This "optimized" PSF may be used as h in the methods of FIGS. 7 and 8, and the corresponding $DCF_{opt}$ may be used by processor 30.

Returning now to 100 in FIG. 7, it was noted earlier that a merit function may be used for scoring the aberrations of the initial optical design. The merit function values are typically supplied to the optical design software in tabular form, and depend on the Zernike polynomial coefficients. To generate the merit function values, each aberration, as defined by the corresponding Zernike polynomial, is converted into a PSF. The form of this PSF reflects the blur that is generated in the optical image due to the particular aberration that the PSF represents. The scores may be computed using the method of FIG. 8. Typical X- and Y-resolution scores computed for Zernike aberration 4 (defocus) and aberration 8 (coma) are shown below in Table I:

TABLE I

ABERRATION MERIT SCORES

|  | X Resolution | Y Resolution |
| --- | --- | --- |
| Zernike Aberration 4 Coefficient |  |  |
| 0.50 | 1.00 | 1.00 |
| 0.60 | 1.00 | 1.00 |
| 0.70 | 0.72 | 0.72 |
| 0.80 | 0.52 | 0.52 |
| 0.90 | 0.45 | 0.45 |
| 1.00 | 0.43 | 0.43 |
| 1.10 | 0.40 | 0.40 |
| 1.20 | 0.34 | 0.34 |
| 1.30 | 0.28 | 0.28 |
| 1.40 | 0.30 | 0.30 |
| 1.50 | 0.38 | 0.38 |
| 1.60 | 0.44 | 0.44 |
| 1.70 | 0.48 | 0.48 |
| 1.80 | 0.48 | 0.48 |
| 1.90 | 0.46 | 0.46 |
| 2.00 | 0.42 | 0.42 |
| 2.10 | 0.36 | 0.36 |
| 2.20 | 0.32 | 0.32 |
| 2.30 | 0.30 | 0.30 |
| 2.40 | 0.28 | 0.28 |
| 2.50 | 0.28 | 0.28 |
| 2.60 | 0.28 | 0.28 |
| 2.70 | 0.27 | 0.27 |
| 2.80 | 0.25 | 0.25 |
| 2.90 | 0.24 | 0.24 |
| 3.00 | 0.25 | 0.25 |
| Zernike Aberration 8 Coefficient |  |  |
| 0.50 | 1.00 | 1.00 |
| 0.60 | 0.96 | 0.99 |
| 0.70 | 0.82 | 0.97 |
| 0.80 | 0.77 | 0.96 |
| 0.90 | 0.76 | 0.92 |
| 1.00 | 0.76 | 0.88 |
| 1.10 | 0.71 | 0.83 |
| 1.20 | 0.64 | 0.80 |
| 1.30 | 0.55 | 0.78 |
| 1.40 | 0.50 | 0.79 |
| 1.50 | 0.49 | 0.77 |
| 1.60 | 0.50 | 0.73 |
| 1.70 | 0.50 | 0.69 |
| 1.80 | 0.50 | 0.66 |
| 1.90 | 0.48 | 0.65 |
| 2.00 | 0.44 | 0.64 |
| 2.10 | 0.40 | 0.64 |
| 2.20 | 0.39 | 0.63 |
| 2.30 | 0.40 | 0.62 |
| 2.40 | 0.39 | 0.58 |
| 2.50 | 0.40 | 0.57 |
| 2.60 | 0.38 | 0.55 |
| 2.70 | 0.36 | 0.55 |
| 2.80 | 0.33 | 0.54 |
| 2.90 | 0.33 | 0.54 |
| 3.00 | 0.34 | 0.54 |

Computation of the merit scores to be applied to the remaining Zernike aberrations will be apparent to those skilled in the art upon studying the foregoing description and examples.

Design Examples

FIG. 9 is a schematic side view of optics 46, designed in accordance with an embodiment of the present invention, using the methods described above. In this embodiment, optics 46 comprise two lenses 130 and 132, both made from polymethyl methacrylate (PMMA), aligned on an optical axis 134. The lenses are both cylindrically symmetrical, and are designed for fixed focus with an object plane at infinity, to the left of lens 130. Lens 130 is spherical, with a diameter of 2.5 mm, center thickness 1.0 mm, and front and rear radii of curvature of 2.12 and 6.71 mm, respectively. Lens 132 is spaced 16 mm behind lens 130 on the optical axis, and is 4.5 mm in diameter and 1.2 mm thick. Filter 48 comprises BK7 glass 0.4 mm thick, and is positioned 0.85 mm behind lens 132 and 0.782 mm in front of the plane of sensor array 22.

Both the front and rear surfaces of lens 132 are aspherical, with even aspheric profiles determined using the optimization method of FIG. 7. To determine the aspheric profiles, the coefficients of the functions that define the lens surface profiles are included as parameters in the response matrix. In other words, gradient values $R_j^i$, as defined above, are determined for each aberration in terms of each of the aspheric lens coefficients. Using this method, the following coefficients are determined for the surfaces of lens 132:

TABLE II

ASPHERIC LENS COEFFICIENTS

| Polynomial order | Front surface | Back surface |
| --- | --- | --- |
| $r^2$ | 0 | 0 |
| $r^4$ | −0.54615 | −0.0034125 |
| $r^6$ | 0.0205194 | −0.0093650 |
| $r^8$ | −0.015842 | 0.00031717 |

Other types of aspheric profiles may be defined and optimized in like manner.

The inventors have found that the optical design of FIG. 9, used in conjunction with the deblurring function described above, gives an output image from camera 44 with modulation transfer function (MTF) that is as good as or better than the image produced by a conventional three-lens objective without deblurring. A sensor array with 1.3 Mpixels was used in both cases. The two-lens design shown in FIG. 9 is less costly to produce and narrower (shorter front-to-back distance) than the three-lens design would be.

Figure 10A:
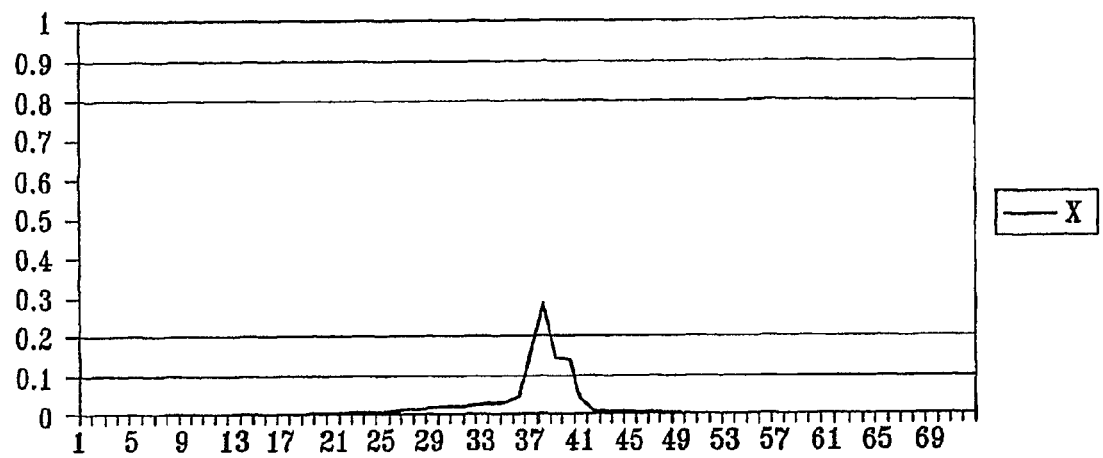
FIGS. 10A and 10B are schematic plots of the PSF of the objective optics shown in FIG. 9.
Figure 10B:
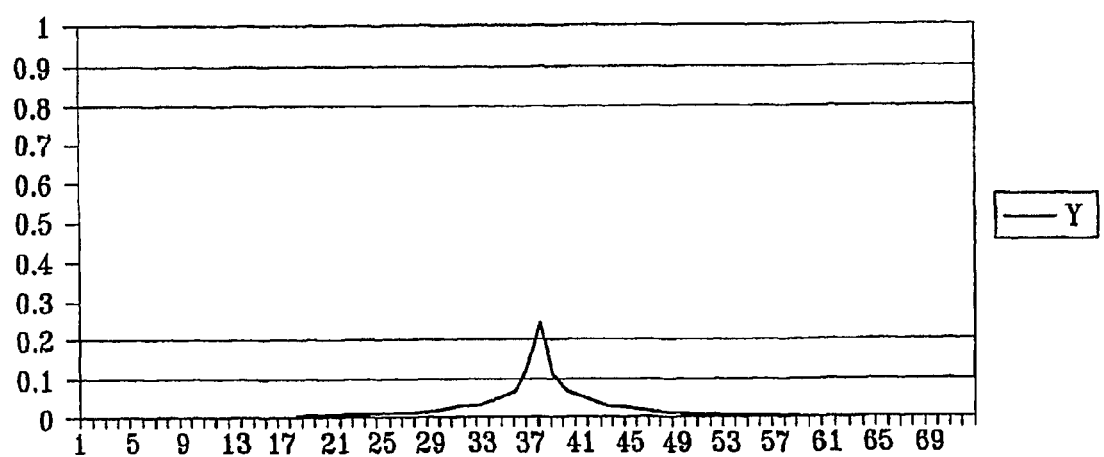

Reference is now made to FIGS. 10A/B, 11A/B and 12A/B, which are plots that exemplify the improvement in PSF that is obtained using the optical design and image processing techniques described above, in accordance with an embodiment of the present invention. FIGS. 10A and 10B schematically show the PSF of the optics of FIG. 9 at a point X=2 mm, Y=0 mm (i.e., displaced by 2 mm from the optical axis) in the image plane of the optics, for light of wavelength 587.6 nm. The horizontal axis is in units of pixels (i.e., pitch) of the sensor array. The PSF is computed as the sum of all the significant aberrations of the optics, wherein the aberrations are typically expressed in terms of the Zernike polynomials. The extent of the PSF on both axes is approximately 3 pixels.

Figure 11A:
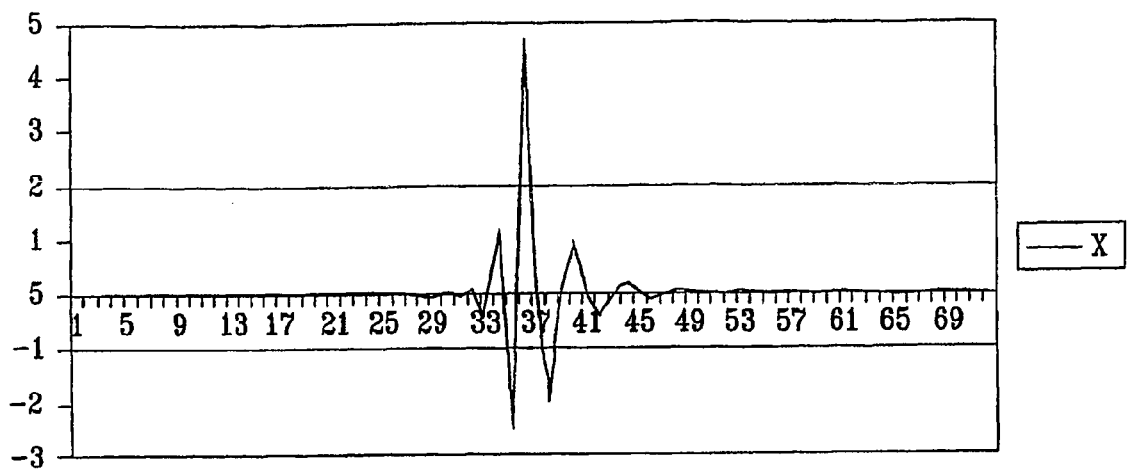
FIGS. 11A and 11B are schematic plots of a deconvolution filter (DCF) kernel that is used to deblur images formed by the optics of FIG. 9, in accordance with an embodiment of the present invention.
Figure 11B:
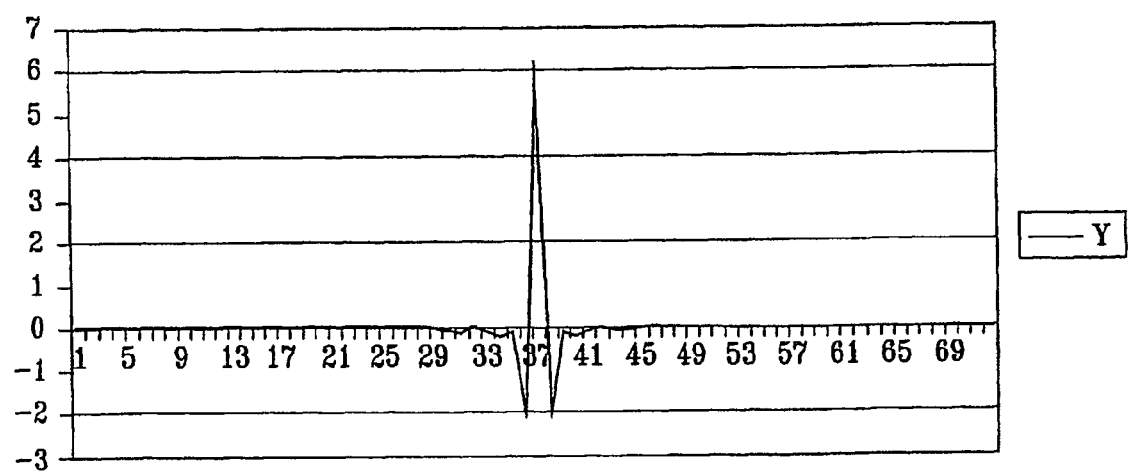

FIGS. 11A and 11B show the elements along the X- and Y-axes of the convolution kernel of the DCF, which is computed so as to correct for the blur created by the PSF of FIGS. 10A and 10B.

Figure 12A:
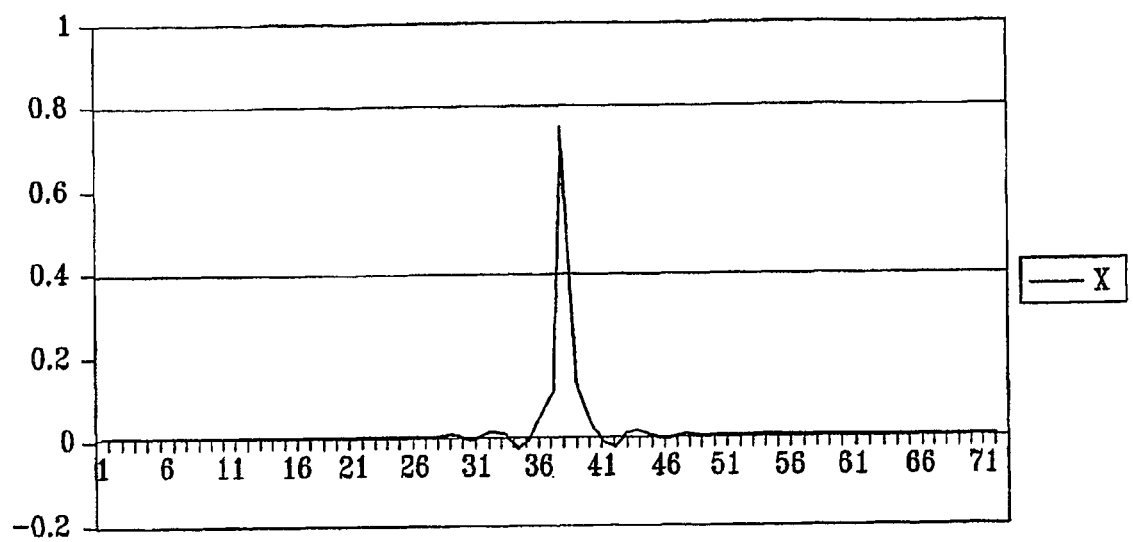
FIGS. 12A and 12B are schematic plots of an enhanced PSF that is obtained by deblurring images using the DCF illustrated in FIGS. 11A and 11B, in accordance with an embodiment of the present invention.
Figure 12B:
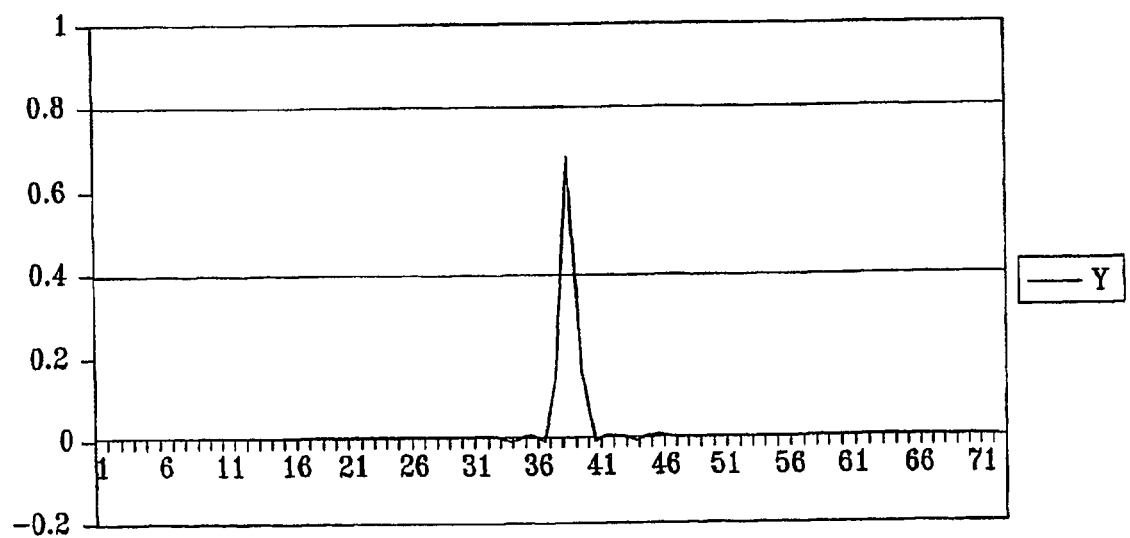

FIGS. 12A and 12B show the enhancement of the PSF that is obtained when the DCF of FIGS. 11A and 11B is applied to images formed by the optics of FIG. 9. The extent of the PSF is now reduced to about 1 pixel in each of the X- and Y-directions.

Alternatively, the deblurring capabilities of processor 30 in camera 44 may be used to gain various other design tradeoffs, for example:

The F-number of optics 46 may be reduced, giving a larger aperture and therefore better light sensitivity. Increasing F-number tends to decrease the camera's depth of field and thus to broaden the PSF, but these effects may be offset by broadening and adjusting the values of the convolution kernel of the deblurring function of processor 30.

Resolution of the output image generated by camera 44 may be enhanced by processor 30, relative to the resolution of a conventional camera with a comparable sensor array and objective optics.

Additionally or alternatively, the capabilities of camera 44 (or camera 20) may be enhanced by configuring processor 30 to adjust the DCF coefficients in response to changes in focal relationships, i.e., changes in the object distance relative to the image distance of the camera. For example:

Camera 44 may be capable of switching to macro operation, for imaging objects very close (typically 5-30 cm) to the camera, without opto-mechanical adjustments. In conventional cameras, macro operation requires very fine mechanical adjustments in the positions of the objective lenses. In camera 30, different object distances may be accommodated by means of changes in the DCF coefficients, which are calculated in advance to compensate for the variation of the PSF with object distance. The DCF coefficients may be stored by processor 30 in a look-up table, and macro operation may be invoked by a software switch.

The field of view of optics 46 may, be increased, for enhanced wide-angle operation. The DCF applied by processor 30 may be adjusted in particular to compensate for degradation of the PSF at the edges of the field.

An electronic zoom function may also be implemented, particularly when a lensless camera is used, as illustrated generally by FIG. 2. Other applications will be apparent to those skilled in the art and are considered to be within the scope of the present invention.

Although the embodiments described above refer to certain particular types and designs of digital cameras, the principles of the present invention may similarly be applied to substantially any type of optical electronic imaging device. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method performed by an image processor, comprising:
receiving a first set of pixel values, which are generated by an array of optical sensing elements in response to optical signals received through a set of objective optics, wherein the objective optics have an associated point spread function (PSF) which causes the first set of pixel values to represent a first blurred image, and wherein the first set of pixel values comprises at least one bad pixel value corresponding to a bad pixel;
updating the first set of pixel values by at least replacing the bad pixel value with a first estimated pixel value to derive a second set of pixel values;
deriving a first deblurred image from the second set of pixel values;
applying the PSF to the first deblurred image to derive a third set of pixel values representing a second blurred image, wherein the third set of pixel values comprises a second estimated pixel value for the bad pixel;
updating the second set of pixel values by at least replacing the first estimated pixel value with the second estimated pixel value to derive an updated second set of pixel values; and
deriving a second deblurred image from the updated second set of pixel values.

2. The method of claim 1,
wherein the second deblurred image is derived, at least in part, by applying a deconvolution filter (DCF) to the updated second set of pixel values and using a blurred map of bad pixels to remove at least a portion of an effect that the second estimated pixel value has on good pixel values in the second deblurred image, wherein a good pixel value is a pixel value corresponding to a non-defective pixel.

3. The method of claim 2, further comprising:
deriving the blurred map of bad pixels, wherein the blurred map of bad pixels is derived by convolving a map of bad pixels with the PSF.

4. The method of claim 3, further comprising:
generating the map of bad pixels.

5. The method of claim 4, wherein the map of bad pixels is generated based at least partially upon the PSF and sample pixel values for various images provided by the array of optical sensing elements.

6. The method of claim 1, further comprising:
applying the PSF to the second deblurred image to derive a fourth set of pixel values representing a third blurred image, wherein the fourth set of pixel values comprises a third estimated pixel value for the bad pixel;
updating the updated second set of pixel values by at least replacing the second estimated pixel value with the third estimated pixel value to derive a further updated second set of pixel values; and
deriving a third deblurred image from the further updated second set of pixel values.

7. The method of claim 1, wherein updating the second set of pixel values does not include updating good pixel values in the vicinity of the first estimated pixel value, wherein a good pixel value is a pixel value corresponding to a non-defective pixel.

8. The method of claim 1, wherein the first deblurred image is derived, at least in part, by applying a first deconvolution filter (DCF) to the second set of pixel values, and wherein the second deblurred image is derived, at least in part, by applying a second DCF to the updated second set of pixel values.

9. The method of claim 6, wherein the first DCF and the second DCF are the same DCF.

10. An imaging apparatus, comprising:
objective optics having an associated point spread function (PSF) that causes image blurring;
an array of optical sensing elements for sensing optical signals received through the objective optics and generating pixel values that represent a blurred image captured by the array, wherein the array has at least one malfunctioning optical sensing element; and
an image processor coupled to the array to receive a first set of pixel values representing a first blurred image, the first set of pixel values comprising a bad pixel value corresponding to the malfunctioning optical sensing element, the image processor configured to update the first set of pixel values by at least replacing the bad pixel value with a first estimated pixel value to derive a second set of pixel values and configured to derive a first deblurred image from the second set of pixel values, the image processor further configured to apply the PSF to the first deblurred image to derive a third set of pixel values representing a second blurred image, wherein the third set of pixel values comprises a second estimated pixel value for the bad pixel, the image processor further configured to update the second set of pixel values by at least replacing the first estimated pixel value with the second estimated pixel value to derive an updated second set of pixel values and configured to derive a second deblurred image from the updated second set of pixel values.

11. The apparatus of claim 10, wherein the image processor derives the second deblurred image, at least in part, by applying a deconvolution filter (DCF) to the updated second set of pixel values and using a blurred map of bad pixels to remove at least a portion of an effect that the second estimated pixel value has on good pixel values in the second deblurred image, wherein a good pixel value is a pixel value corresponding to a non-malfunctioning optical sensing element.

12. The apparatus of claim 11, wherein the image processor is further configured to derive the blurred map of bad pixels by convolving a map of bad pixels with the PSF.

13. The apparatus of claim 10, wherein the PSF has an associated extent and the array has an associated pitch, and wherein the extent of the PSF is at least three times the pitch of the array.

14. An image processor configured to receive a first set of pixel values, which are generated by an array of optical sensing elements in response to optical signals received through a set of objective optics, wherein the objective optics have an associated point spread function (PSF) which causes the first set of pixel values to represent a first blurred image, and wherein the first set of pixel values comprises at least one bad pixel value corresponding to a bad pixel, the image processor further configured to update the first set of pixel values by at least replacing the bad pixel value with a first estimated pixel value to derive a second set of pixel values and configured to derive a first deblurred image from the second set of pixel values, the image processor further configured to apply the PSF to the first deblurred image to derive a third set of pixel values representing a second blurred image, wherein the third set of pixel values comprises a second estimated pixel value for the bad pixel, the image processor further configured to update the second set of pixel values by at least replacing the first estimated pixel value with the second estimated pixel value to derive an updated second set of pixel values and configured to derive a second deblurred image from the updated second set of pixel values.

15. The image processor of claim 14, wherein the image processor derives the second deblurred image, at least in part, by applying a deconvolution filter (DCF) to the updated second set of pixel values and using a blurred map of bad pixels to remove at least a portion of an effect that the second estimated pixel value has on good pixel values in the second deblurred image, wherein a good pixel value is a pixel value corresponding to a non-defective pixel.

16. The image processor of claim 15, wherein the image processor is further configured to derive the blurred map of bad pixels by convolving a map of bad pixels with the PSF.

17. The image processor of claim 16, wherein the image processor is further configured to generate the map of bad pixels.

18. The image processor of claim 17, wherein the image processor generates the map of bad pixels based at least partially upon the PSF and sample pixel values for various images provided by the array of optical sensing elements.

19. The image processor of claim 14, wherein the image processor is further configured to apply the PSF to the second deblurred image to derive a fourth set of pixel values representing a third blurred image, wherein the fourth set of pixel values comprises a third estimated pixel value for the bad pixel, and wherein the image processor is further configured to update the updated second set of pixel values by at least replacing the second estimated pixel value with the third estimated pixel value to derive a further updated second set of pixel values and configured to derive a third deblurred image from the further updated second set of pixel values.

20. The image processor of claim 14, wherein updating the second set of pixel values does not include updating good pixel values in the vicinity of the first estimated pixel value, wherein a good pixel value is a pixel value corresponding to a non-defective pixel.

21. The apparatus of claim 10, wherein updating the second set of pixel values does not include updating good pixel values in the vicinity of the first estimated pixel value, wherein a good pixel value is a pixel value corresponding to a non-defective pixel.

22. The apparatus of claim 10, wherein the first deblurred image is derived, at least in part, by applying a first deconvolution filter (DCF) to the second set of pixel values, and wherein the second deblurred image is derived, at least in part, by applying a second DCF to the updated second set of pixel values.

23. The apparatus of claim 22, wherein the first DCF and the second DCF are the same DCF.

* * * * *